United States Patent
Miyashita

(10) Patent No.: US 7,263,366 B2
(45) Date of Patent: Aug. 28, 2007

(54) CHANNEL SELECTION METHOD, AND WIRELESS STATION AND WIRELESS TERMINAL EMPLOYING IT

(75) Inventor: Akira Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 236 days.

(21) Appl. No.: 10/911,472

(22) Filed: Aug. 5, 2004

(65) Prior Publication Data

US 2005/0032537 A1 Feb. 10, 2005

(30) Foreign Application Priority Data

Aug. 6, 2003 (JP) ............................. 2003-287257

(51) Int. Cl.
*H04Q 7/20* (2006.01)
(52) U.S. Cl. .................. 455/452.2; 455/63.1; 455/450; 455/452.1; 455/509; 370/329; 370/332; 370/431; 370/437
(58) Field of Classification Search ............... 455/63.1, 455/63.3, 434, 447, 450–454, 455, 463, 464, 455/509, 515, 516, 517; 370/329, 330, 332, 370/338, 341, 343, 431, 437, 464, 480
See application file for complete search history.

(56) References Cited

U.S. PATENT DOCUMENTS

| | | | |
|---|---|---|---|
| 5,408,506 A * | 4/1995 | Mincher et al. ............. | 375/134 |
| 6,208,629 B1 * | 3/2001 | Jaszewski et al. .......... | 370/329 |
| 6,834,045 B1 * | 12/2004 | Lappetelainen et al. .... | 370/329 |
| 6,870,815 B2 * | 3/2005 | McFarland et al. ......... | 370/250 |
| 6,985,465 B2 * | 1/2006 | Cervello et al. ............ | 370/333 |
| 2002/0188723 A1 * | 12/2002 | Choi et al. .................. | 709/225 |
| 2003/0002456 A1 * | 1/2003 | Soomro et al. ............. | 370/328 |
| 2003/0040319 A1 | 2/2003 | Christopher | |
| 2003/0171116 A1 * | 9/2003 | Soomro ...................... | 455/434 |
| 2003/0219001 A1 * | 11/2003 | de Prado Pavon et al. . | 370/338 |
| 2004/0146022 A1 * | 7/2004 | Lewis et al. ................ | 370/331 |
| 2004/0192300 A1 * | 9/2004 | Backes et al. .............. | 455/434 |
| 2005/0026610 A1 * | 2/2005 | Backes et al. .............. | 455/434 |
| 2005/0265295 A1 * | 12/2005 | Ishizuka ..................... | 370/336 |

FOREIGN PATENT DOCUMENTS

EP 0 490 509 A 6/1992

* cited by examiner

*Primary Examiner*—William Trost
*Assistant Examiner*—James D Ewart
(74) *Attorney, Agent, or Firm*—Dickstein, Shapiro, LLP.

(57) ABSTRACT

At the time of a normal operation, a second channel change message 30b is transmitted from the AP to each terminal before a time T0 until a channel change that is included in a first channel change message 30a elapses, thereby all terminals that received this message 30b, and the AP stop changing the channel. At the time of interference occurrence, setting a time until a channel change to be filed in a third channel change message 30d to a time equal to or less than a lapse time until the channel change at the time point of transmitting this message 30d to transmit it to each terminal from the AP allows the terminal that failed to receive the message at the time of the interference occurrence to make a channel change without causing a connection to the AP to be disconnected.

5 Claims, 24 Drawing Sheets

CHANNEL SELECTION METHOD, AND WIRELESS STATION AND WIRELESS TERMINAL EMPLOYING IT

BACKGROUND OF THE INVENTION

The present invention relates to a communication channel selection method, and a wireless station and a wireless terminal employing it, and more particularly to an interference avoidance technique in a wireless network system.

A wireless LAN system to be represented by the 802.11 standard standardized in the Institute of Electrical and Electronics Engineers (hereinafter, described as the IEEE), which is generally configured of an access point (AP) for connecting a wireless network and a wire network, and a plurality of wireless terminals, in which mutual communication is made by employing one of a plurality of frequency channels that are available. In such a wireless LAN system, however, a shared frequency band requiring no license is generally utilized, whereby the possibility exists that neighboring other wireless LAN systems utilize an identical frequency channel. At this moment, interference between the neighboring wireless LAN systems that causes communication performance of its own system to degrade due to a radio wave to be transmitted by the other system. As one of means for avoiding this interference, a method is generally known of removing an interference status by changing the frequency channel that the wireless LAN system uses.

The foregoing interference avoidance method by the channel change was not specially specified in the conventional wireless LAN system (IEEE standard 802.11); however the AP packages means for detecting the interference, and means for changing the channel to be used, thereby making it possible to realize interference avoidance by changing the channel. In this case, the AP, which judged that the channel to be used had to be changed because interference was detected, can change its own channel; however it has no means for notifying it to the other terminal. Accordingly, when the AP made a channel change, the terminal is not able to recognize it, which causes a connection between the AP and the terminal to be disconnected. The terminal of which a connection was disconnected searches for the AP by scanning each channel for re-connection.

That is, the conventional wireless LAN system based upon the IEEE 802.11 standard had the problem that a communication disconnection time during which communication between the wireless stations became impossible to make because of the use channel change by the wireless LAN system became long.

So as to solve this problem, the IEEE standard 802.11h Potential Draft Text (02/245r2) to be cited as a non-patent document 1 defined a channel change notification message for notifying each terminal that the AP changed the channel. The time until the channel change and the change destination channel were shown in this channel change notification message. The terminal that received this channel change notification message can recognize when the AP changes which channel, which allows reduction of the communication disconnection time to be expected.

[Non-Patent Document 1]

EEE Standard 802.11h Potential Draft Text (02/245r2)

As described above, a format of the channel change notification message was specified in the non-patent document 1; however its transmission method was not specified. A transmission error exists intrinsically in the wireless communication, so the possibility exists that the terminal is not able to receive the channel change notification message from the AP correctly. The terminal that failed to receive the channel change notification message is not able to recognize the channel change by the AP, whereby it reconnects with the AP again after a lapse of a long communication disconnection time according to a process similar to that of the conventional wireless LAN system specified in the IEEE 802.11. That is, there is the problem that the terminal, which is not able to make a channel change at a timing that the AP intended due to the transmission error, can exist.

SUMMARY OF THE INVENTION

An objective of the present invention is to provide a communication channel selection method adapted to prevent a connection to the AP from being disconnected in a case where the terminal failed to receive the channel change notification message from the AP due to occurrence of the interference, and a wireless station and a program employing it.

The channel selection method in accordance with the present invention, which is a channel selection method in a communication system for making communication between a first wireless station and one or each of a plurality of second wireless stations different from said first wireless station by employing one of a plurality of wireless channels, is characterized in that: said first wireless station includes the steps of: transmitting a first channel change notification including a first time until a channel change and a change destination channel to said second wireless station; and prior to a lapse of said first time, transmitting a second channel change notification including a second time until a channel change and a change destination channel to said second wireless station; and said first and second wireless stations include a step of assuming the time until the channel change to be said second time.

Another channel selection method in accordance with the present invention, which is a channel selection method in a communication system for making communication between a first wireless station and one or each of a plurality of second wireless stations different from said first wireless station by employing one of a plurality of wireless channels, is characterized in that, responding to interference occurrence: said first wireless station includes the steps of: transmitting a first channel change notification including a first time until a channel change and a change destination channel to said second wireless station; and prior to a lapse of said first time, transmitting a second channel change notification including a second time until a channel change and a change destination channel to said second wireless station; and sets said second time to a time that becomes identical to a channel change timing that is indicated by said first time.

The wireless station in accordance with the present invention, which is a wireless station for making communication with one or a plurality of other wireless stations by employing one of a plurality of wireless channels, is characterized in including the means for: transmitting a first channel change notification including a first time until a channel change and a change destination channel to said other wireless station; and prior to a lapse of said first time, transmitting a second channel change notification including a second time until a channel change and a change destination channel to said other wireless stations; and assuming said time until said channel change to be said second time.

Another wireless station in accordance with the present invention, which is a wireless station for making communication with other wireless station by employing one of a plurality of wireless channels, is characterized in: including means for; responding to interference occurrence, transmitting a first channel change notification including a first time until a channel change and a change destination channel to said other wireless station; and prior to a lapse of said first time, transmitting a second channel change notification including a second time until a channel change and a change destination channel to said other wireless station; and setting said second time to a time that becomes identical to a channel change timing that is indicated by said first time.

The wireless terminal in accordance with the present invention, which is a wireless terminal for, by employing a wireless channel for which an instruction was given by a wireless station, making communication with said wireless station, is characterized in including the means for: receiving a first channel change notification including a first time until a channel change and a change destination channel, which is transmitted from said wireless station; and receiving a second channel change notification including a second time until a channel change and a change destination channel, which is transmitted from said wireless station prior to a lapse of said first time; and assuming said time until said channel change to be said second time.

The program in accordance with the present invention, which is a program for causing a computer to execute an operation of a wireless station for making communication with other wireless station by employing one of a plurality of wireless channels, is characterized in including the steps of: transmitting a first channel change notification including a first time until a channel change and a change destination channel to said other wireless station; prior to a lapse of said first time, transmitting a second channel change notification including a second time until a channel change and a change destination channel to said other wireless station; and assuming said time until said channel change to be said second time.

Another program in accordance with the present invention, which is a program for causing a computer to execute an operation of a wireless station for making communication with other wireless station by employing one of a plurality of wireless channels, is characterized in, responding to interference occurrence: including a step of: transmitting a first channel change notification including a first time until a channel change and a change destination channel to said other wireless station; and prior to a lapse of said first time, transmitting a second channel change notification including a second time until a channel change and a change destination channel to said other wireless station; and setting said second time to a time that becomes identical to a channel change timing that is indicated by said first time.

Yet another program in accordance with the present invention, which is a program for causing a computer to execute an operation of a wireless terminal for, by employing a wireless channel for which an instruction was given by a wireless station, making communication with said wireless station, is characterized in including the steps of: receiving a first channel change notification including a first time until a channel change and a change destination channel, which is transmitted from said wireless station; receiving a second channel change notification including a second time until a channel change and a change destination channel, which is transmitted from said wireless station prior to a lapse of said first time; and assuming said time until said channel change to be said second time.

An advantageous operation of the present invention will be described. In a channel selection method in a communication system for making communication between a first wireless station and one or each of a plurality of second wireless stations different from this first wireless station by employing one of a plurality of wireless channels, the first wireless station transmits a first channel change notification including a first time until a channel change and a change destination channel to the second wireless station, and prior to a lapse of the above first time, transmits a second channel change notification including a second time until a channel change and a change destination channel to the above second wireless station. And, the first and the second wireless stations are adapted to assume the time until the channel change to be the second time. Doing so allows a connection to the AP to be prevented from being disconnected in a case where the terminal failed to receive the channel change notification message from the AP due to occurrence of the interference.

In accordance with a first to third embodiments of the present invention, the effect exists that the AP transmits the channel change notification message to the terminal prior to occurrence of the interference, thereby allowing the terminal that failed to receive the channel change notification message at the time of the interference occurrence to make a channel change without causing a connection to the AP to be disconnected.

Also, in accordance with a fourth embodiment of the present invention, the effect exists that the AP transmits the channel change notification message to the terminal plural times only after occurrence of the interference, thereby allowing the provability that the channel change notification message is received in all terminals to be enhanced while a traffic amount before the interference occurrence is curtailed.

Further, in accordance with a fifth and a sixth embodiments of the present invention, the effect exists that the AP itself checks each interference status of a plurality of the channels, and decides to assume the optimum channel to be a change destination channel, whereby the effect exists that a change to the optimum channel is made possible after the interference occurrence.

Further, also, in accordance with a seventh embodiment of the present invention, the effect exists that a management server that manages the AP manages the channel that each AP uses, and the interference status of each channel collectively, decides the change destination channel based upon these, and notifies it to each AP, thereby allowing a load of each AP to be alleviated drastically. Also, the server can make a supervisory management of the situation of each AP and the interference status of each channel, which makes it possible to take a control in such a manner that the interference occurrence is suppressed as a whole of the area.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

In a channel selection method in a communication system for, by employing one of a plurality of wireless channels, making communication between a first wireless station and one or each of a plurality of second wireless stations different from this first wireless station, the first wireless station transmits a first channel change notification including a first time until a channel change and a change destination channel to the second wireless station, and prior to a lapse of the above first time, transmits a second channel change notification including a second time until a channel change and a change destination channel to the above second wireless station. And, the first and the second wireless stations are adapted to assume the time until the channel change to be said second time.

Embodiment 1

Figure 1:
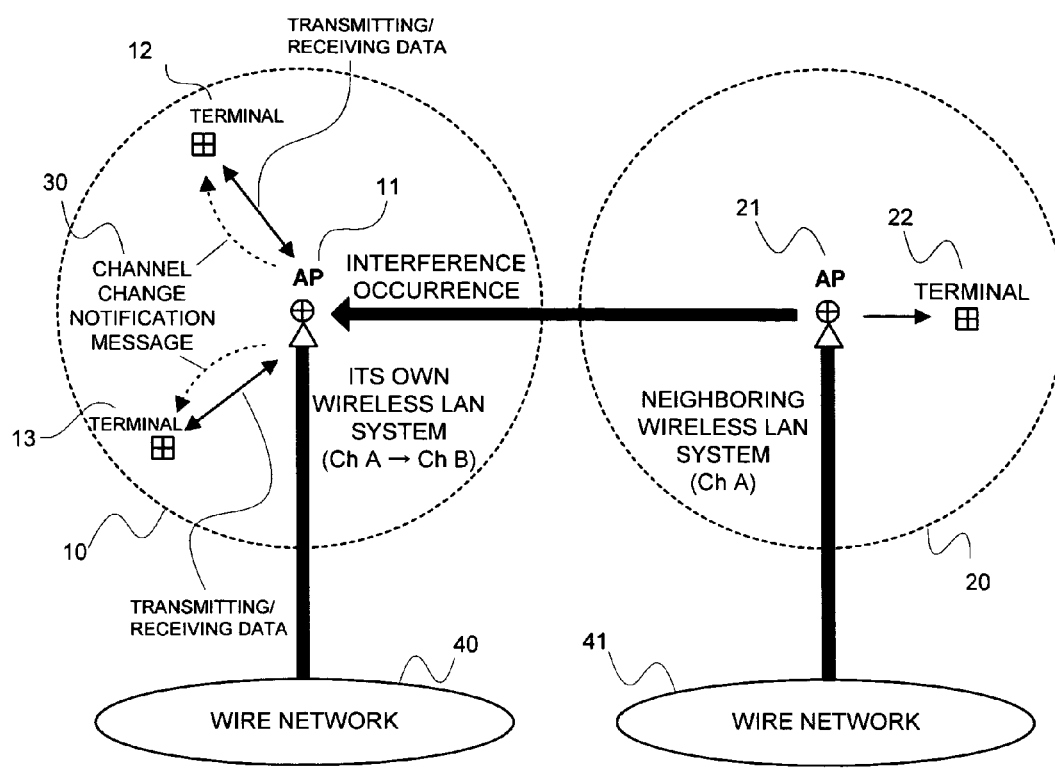
FIG. 1 is a view illustrating the network system for which the present application applies.

Next, the embodiments of the present invention will be explained in details, by making a reference to the accompanied drawings. FIG. 1 illustrates a network system in the first embodiment of the present invention. A wireless LAN system 10 that is configured of an access point (hereinafter, expressed as an AP) 11 and wireless terminals 12 and 13, and a wireless LAN system 20 that is configured of an AP 21 and a wireless terminal 22 exist herein. Also, the AP 11 is connected to a wire network 40, which allows the wireless terminals 12 and 13 to make communication with appliances on the wire network 40 via the AP 11. Similarly, the AP 21 is connected to a wire network 41, which allows the wireless terminal 22 to make communication with the appliances on the wire network 41.

Additionally, in FIG. 1, the wire network 40 and the wire network 41 were separated for illustration; however a single wire network may be configured of these.

In this embodiment, the wireless LAN systems 10 and 20 both make data communication by employing a frequency channel A (hereinafter, expressed as Ch A). Further, the AP 11 and the AP 21, which are positioned in such a manner that the electric wave of each reaches the other, use the identical Ch A, whereby the interference occurs, which causes the communication to be obstructed. In a case where the interference occurred in such a manner, the wireless LAN system 10 has a function provided of avoiding occurrence of the interference by changing the channel from Ch A to the other channel (for example, Ch B). This channel change is realized, by transmitting a channel change notification message 30 by the AP 11 to the wireless terminals 12 and 13 under management thereof.

Figure 2:
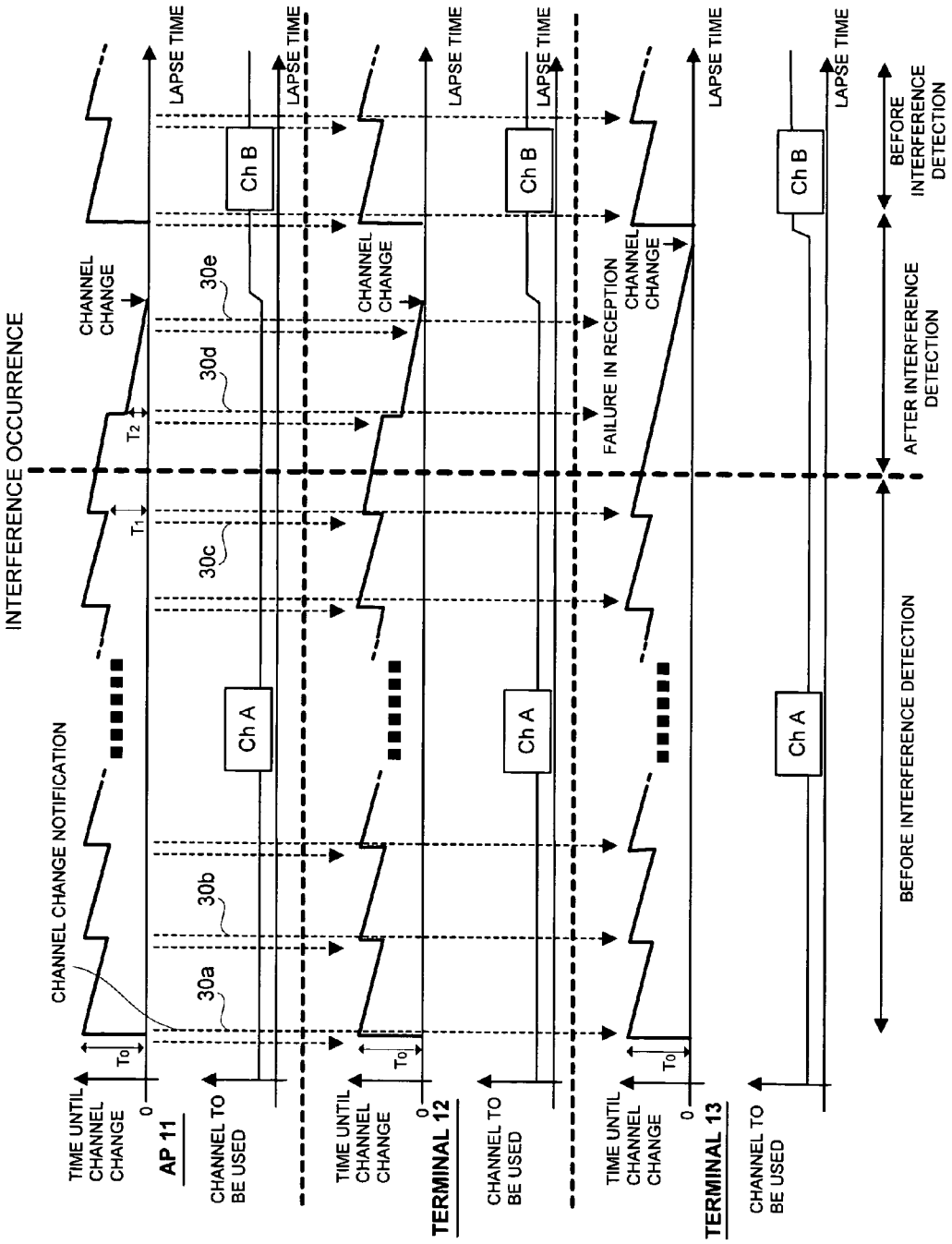
FIG. 2 is a view illustrating an example of the channel change method in the first embodiment.

A channel change method provided in this wireless LAN system 10 will be explained, by making a reference to a timing chart of FIG. 2. FIG. 2 shows a transition of the time until the channel change, which each of the AP 11 and the wireless terminals 12 and 13 are managing, with the time lapse. Additionally, a specific management method of the time until the channel change will be described later.

The AP 11 transmits channel change notification message 30a to 30e to all wireless terminals (wireless terminals 12 and 13) belonging to the wireless LAN system 10. It is enough that these messages are transmitted so that all wireless terminals can obtain a chance of receiving the message, and not only it may be separately transmitted to each wireless terminal with a unicast, but also it may be collectively transmitted to all wireless terminals with a broadcast.

These channel change notification message 30a to 30e have at least the channel change destination and the time until the channel change filed. The wireless terminal receives these messages, knows a channel change schedule of the AP 11 (when a change to which channel is made), and sets the channel change schedule of the terminal itself according hereto, thereby allowing the communication disconnection time accompanying the channel change to be reduced.

Specifically, as shown in FIG. 2, the wireless terminal that received the channel change notification messages 30a to 30e to be transmitted from the AP 11 sets the time until its own channel change according to the time to be filed in its messages. At this moment, in this embodiment is employed a method of, in a case where a new channel change notification message was received before the channel change time (the time obtained by adding the time until the channel change filed in the message to the time that its message was received) previously received comes, re-scheduling the channel change to the time until the channel change filed in the new message.

Next, a method of transmitting the channel change message by the AP 11 will be explained. The AP 11 has a specification incorporated for applying the message transmission method that differs between the period before the interference detection and the period after the interference detection (until a channel change process is completed since an execution of the channel change process was decided).

At first, a method of, in the period before the interference detection, transmitting the channel change message by the AP 11 will be explained. In this case, the wireless LAN system 10 does not need to change the channel because no interference was detected. Accordingly, the AP 11 transmits a new channel change notification message before a channel change timing by the channel change notification message previously transmitted comes, and causes the terminal to postpone the channel change process so that the channel change process is not performed actually in the terminal.

Specifically, for example, the AP 11 transmits the channel change notification message 30*b* before the channel change timing by the channel change notification message 30*a* transmitted just previously comes. That is, in the timing chart of FIG. 2, the next new channel change notification message 30*b* is transmitted before a [time until the channel change T0] that is included in the channel change notification message 30*a* elapses, i.e. at a timing in which a remaining time T1 until the channel change still exists.

Further, the time until the channel change to be filed in the channel change notification message 30*b* is set so that the channel change time by the channel change notification message 30*b* is behind the channel change time by the channel change notification message 30*a* previously transmitted (in an example of FIG. 2, T0 was set). Making a setting in such a manner allows the channel change notification process by the channel change notification message 30*a* to be cancelled (overwritten) by the channel change notification message 30*b*.

As described above, whether or not the channel change notification message is transferred from the AP 11 to the wireless terminal 12 and the wireless terminal 13 at any time, it is cancelled by a new message at any time in the period before the interference detection, thereby eliminating the possibility that the channel change process is executed actually.

Additionally, the change destination channels filed in each channel change notification message do not need to be identical always, and the change destination channel may be changed responding to the interference situation of each channel that can be a change destination one.

Continuously, a method of, in the period after the interference detection, transmitting the channel change message by the AP 11 will be explained. After the interference detection, the channel needs to be changed so as to avoid it. At this moment, the AP 11 transmits such a channel change notification message newly that the channel change time by the channel change notification message previously transmitted is not postponed.

Specifically, for example, the time until the channel change to be filed in the channel change notification message 30*e* is set so that the channel change time by this message becomes identical to the channel change time by the channel change notification message 30*d* transmitted just previously.

By making a setting in such a manner, the channel change notification process by the channel change notification message 30*d* is scheduled without cancellation by the channel change notification message 30*e*. Accordingly, the channel change process is executed at the time scheduled by the message 30*d* (an operation of the terminal 12 of FIG. 2).

Applying the channel change method as described above makes it possible to reduce the provability that the change schedule of the AP 11 is not notified to the wireless terminal due to the failure in receiving the channel change notification message. For example, in FIG. 2, the wireless terminal 13 failed to receive the channel change notification messages 30*d* and 30*e*; however its terminal, which successfully received the message 30*c* transmitted prior thereof, can perform the channel change process based upon its content.

Additionally, so as to enhance the provability of rescuing the wireless terminal that failed to receive such messages, a method was applied in this embodiment of assuming the change destination channel that was filed in the channel change notification messages 30*d* and 30*e* transmitted after the interference detection to be a value to identical to the value filed in the message 30*c* just before the interference detection. This allows the wireless terminal that received one of the channel change notification message 30*c* and the later one at least once to recognize where the channel change destination of the AP 11 is.

Also, in FIG. 2, a setting was made so that the channel change time that was derived from a time T2 until the channel change to be filed in the channel change notification message 30*d* that was transmitted just after the interference detection became a time equal to or less than the time until the channel change at the time point of transmitting this message 30*d*, whereas the channel change times that were derived from the messages 30*d* and 30*e* became identical. This was set by aiming at getting out of the interference status as soon as possible, and simultaneously therewith, at reducing a state, if possible, where the AP and the wireless terminal existed in a different channel respectively.

Figure 3:
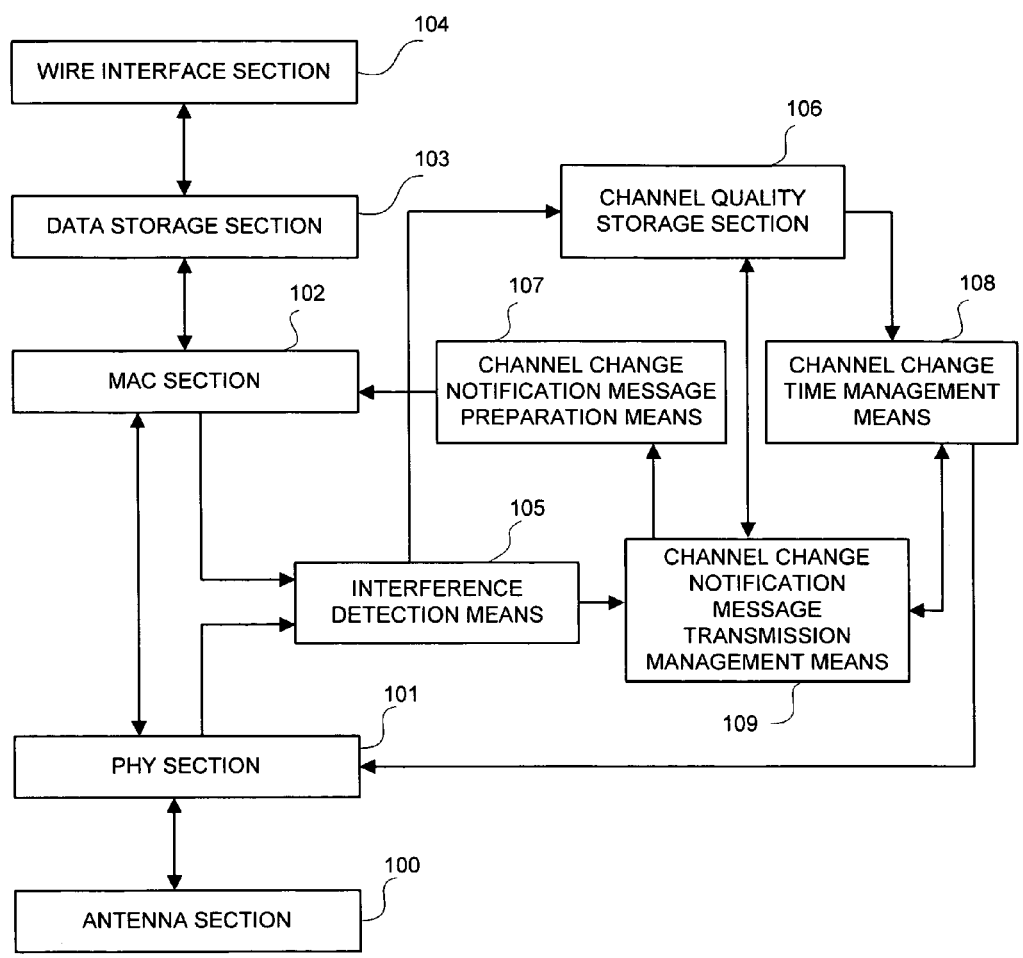
FIG. 3 is a view illustrating the configuration of the AP of the first embodiment.

Continuously, a configuration of the AP and the wireless terminal having a function provided of processing the channel change method explained in FIG. 2 will be explained. At first, the configuration of the AP 11 to be used in this embodiment is shown in FIG. 3. The AP 11 includes an antenna section 100, a PHY (Physical layer) section 101, an MAC (Media Access Control) section 102, a data storage section 103, a wire interface section 104, interference detection means 105, a channel quality storage section 106, channel change notification message preparation means 107, channel change time management means 108, and channel change notification message transmission management means 109.

Hereinafter, each section thereof will be explained. The antenna section 100 provides an interface for transmitting/receiving data between the AP and a transmission medium (space). It outputs a signal input from the PHY section 101 to the space at the time of transmitting data. On the other hand, at the time of receiving data, it receives a signal transmitted in the space, and outputs it to the PHY section 101.

The PHY section 101 provides an interface between the antenna section 100 and the MAC section 102. When data was input from the MAC section 102, the PHY section 101 affixes a PHY header hereto, further converts it into a radio signal of which a central frequency is a channel frequency that is used currently for transmission. On the other hand, when the radio signal was input from the antenna section 100, it demodulates it, and outputs it to the MAC section 102. Also, it has a function of changing the channel that is employed for transmitting/receiving data, with a request by the channel change time management means 108 assumed to be a trigger The MAC section 102 has a preparation/decryption function of a MAC frame, and a medium access control function at the time of transmitting the frame. At the time of transmitting data, the MAC section 102 converts data to be input from the data storage section 103, and the channel change message to be input from the channel change notification message preparation means 107 into a frame, and outputs its frame to the PHY section 101 if the space is in an idle status where the signal can be transmitted. On the other hand, when a reception frame was input from the PHY section 101, the MAC section 102 confirms a destination of its frame, and if it is a data frame that the AP 11 itself should receive, it outputs the received data to the data storage section 103 after it transmitted a confirmation response.

The data storage section 103 makes a buffering of data transmitted/received between the wire interface section 104 and the MAC section 102. At the time that the data is input from the wire interface section 104, it stores data to be input, and outputs it to the MAC section 102 at an appropriate time. On the other hand, at the time that the data is input from the MAC section 102, it stores data to be input, and outputs it to the wire interface section 104 at an appropriate time.

The wire interface section 104 provides an interface between the data storage section 103 and the wire network. When data is input from the wire network, it outputs data that was input to the data storage section 103. On the other hand, when data is input from the data storage section 103, it outputs data that was input to the wire network. Additionally, a detailed function of the wire interface section 104 has a tenuous relation with this application, so it is not described herein.

The interference detection means 105 have a function of detecting an interference level from information that is obtained from the PHY section 101 and the MAC section 102 to output it the channel quality storage section 106. The interference detection means 105 perform this process autonomously for not only the channel that is being used, but also other channels that the system can use. Further, as a result of the interference detection, when it was determined that the interference level detection result of the channel that was used exceeded a certain threshold, and that the channel needed to be changed in order to avoid its interference, it requests the channel change process of the channel change notification message transmission management means 109. Additionally, a specific function for detecting the interference has a tenuous relation with this application, so it is not described herein; however, for example, a function is listed of detecting a control signal of the wireless system that becomes an interference source with a scan that is a function that the wireless LAN system of the 802.11 standard has.

The channel quality storage section 106 has a function of storing the interference detection result by the interference detection means 105 channel by channel. A reference is made to this interference detection result by the channel change time management means 108, and the channel change notification message transmission management means 109, as described later.

The channel change notification message preparation means 107 have a function of preparing the channel change notification message that the AP transmits to the wireless terminal to output it to the MAC section 102. This preparation of the channel change notification message is made responding to a request by the channel change notification message transmission management means 109. Information (the time until the channel change and the change destination channel) to be filed in the channel change notification message is also input from the channel change notification message transmission management means 109.

The channel change time management means 108 have means (channel change timer) for managing the time until the channel change is made. This value of the channel change timer is set to a value identical to the time until the channel change that, at a timing in which the channel change notification message transmission management means 109 request the channel change notification message preparation means 107 to prepare a message, is filed in its message. Also, the value of the channel change timer reduces as the time elapses, and a value 0 signifies that the channel change time came.

When the value of the channel change timer amounted to 0, the channel change time management means 108 request the PHY section 101 to change the channel to be used for the data transmission/reception, by making a reference to the channel quality storage section 106.

The channel change notification message transmission management means 109 have a function of deciding transmission of the channel change notification message to the wireless terminal, and a function of deciding the change destination of the channel and the time until the channel change that are information to be filed in the message to be transmitted. It decides a channel of which the interference detection level is lowest for the change destination of the channel, by making a reference to the interference detection situation of each channel to be stored in the channel quality storage section 106. On the other hand, it sets a different value for the time until the channel change in a case where no interference occurred in the channel that is being used, and a case where it occurred respectively, as explained hereinafter.

In a case where no interference occurred in the channel that is being used, and the channel does not need to be changed, it is decided to transmit the channel change notification message newly before the time until the channel change, which the channel change time management means 108 indicate, amounts to 0. At this moment, the time until the channel change to be filed in the message is set to a time longer than the remaining time until the channel change that the channel change time management means 108 indicate. So far as this time setting rule is observed, the value to be filed in the message may be set to an identical value at any time (in an example of FIG. 2, with an initial value T0, it was set to an identical value at any time), and it may be set to a different value message by message.

On the other hand, in a case where the channel change was requested by the interference detection means 105 due to occurrence of the interference in the channel that is being used, the time until the channel change to be filed in the message is set to a time equal to or less than the remaining time until the channel change that the channel change time management means 108 indicate.

Figure 4:
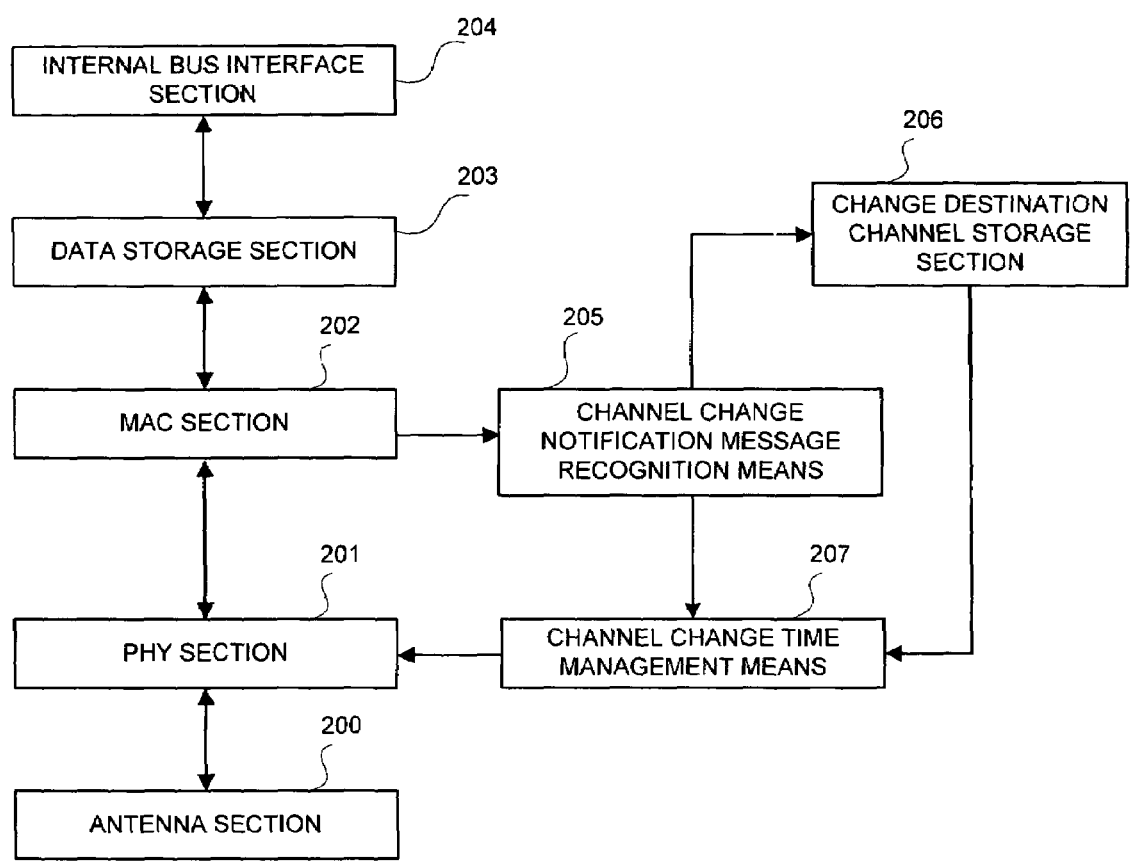
FIG. 4 is a view illustrating the configuration of the terminal of the first embodiment.

Next, a configuration of the wireless terminal 12 and the wireless terminal 13 is shown in FIG. 4. As shown in FIG. 4, the wireless terminal 12 and the wireless terminal 13 include an antenna section 200, a PHY section 201, an MAC section 202, a data storage section 203, an internal bus interface section 204, channel change notification message recognition means 205, a change destination channel storage section 206, and channel change time management means 207 respectively. A functional block that is not shown in the figure, which is included in the wireless terminal 12 and the wireless terminal 13, has a tenuous relation with the present invention, so its explanation is omitted.

Hereinafter, each thereof will be explained. The antenna section 200 and the PHY section 201 have a function identical to that of the antenna section 100 and the PHY section 101 of the AP 11 respectively.

The MAC section 202 has a preparation/decryption function of the MAC frame, and a medium access control function at the time of transmitting the frame. The MAC section 202 converts data to be input from the data storage section 203 into a frame, and outputs its frame to the PHY section 201 if the space is in an idle status where the signal can be transmitted. On the other hand, when the reception frame was input from the PHY section 201, if it is a data frame that the MAC 202 section itself should receive, the MAC section 202 outputs the received data to the data storage section 203 after it transmitted the confirmation response. Further, in a case where the frame having the channel change notification message included was input, it extracts the channel change notification message from the frame, and outputs it to the channel change notification message recognition means 205.

The data storage section 203 makes a buffering of data transmitted/received between the internal bus interface section 204 and the MAC section 202. When the data is input from the internal interface section 204, it stores data to be input, and outputs it to the MAC section 202 at an appropriate time. When the data is input from the MAC section 202, it stores data to be input, and outputs it to the internal bus interface section 204 at an appropriate time.

The internal bus interface section 204 provides an interface between the data storage section 203 and an internal bus of the wireless terminal 12 (wireless terminal 13). When data is input from the internal bus, it outputs the data that was input to the data storage section 203. When the data is input from the data storage section 203, it outputs the data that was input to the internal bus.

The channel change notification message recognition means 205 have a function of extracting information within the channel change notification message. It extracts the time until the channel change, and information of the channel that becomes a change destination from the channel change notification message to be input from the MAC section 202. The extracted information of the channel that becomes a change destination is output to the change destination channel storage section 206, and the time until the channel change to the channel change time management means 207.

The change destination channel storage section 206 has a function of storing information of the channel that becomes a change destination when the wireless terminal 12 (wireless terminal 13) changes the channel. The change destination channel information to be stored is overwritten and updated whenever new information is input from the channel change notification message recognition means 205.

The channel change time management means 207 have means (channel change timer) for managing the time until the channel change is made. When the time until the channel change is newly input from the channel change notification message recognition means 205, the value of the channel change timer is set to its value. Also, the remaining time until the channel change that the channel change timer indicates reduces as the time elapses, and when it amounts to 0, the channel change time management means 207 request the PHY section 201 to change the channel to be used for the data transmission/reception, by making a reference to the information of the channel that becomes a change destination channel indicated by the channel change destination storage section 206.

Next, an operation of the AP 11 and the wireless terminals 12 and 13 of this embodiment will be explained, by making a reference to flowcharts of FIG. 5 and FIG. 6 respectively. At first, the operation of the AP 11 will be explained, by making a reference FIG. 5.

When a power sourced is applied to the AP 11, the channel change notification message transmission management means 109 decide an initial value (Ch B in FIG. 2) of the channel that becomes a change destination (step S1), and decides an initial value T0 of the time until the channel change (step S2). Continuously, so as to notify each of the decided initial values to the wireless terminal, the channel change notification message transmission management means 109 request the channel change notification message preparation means 107 to prepare the channel change notification message having each initial value filed, and the channel change notification message preparation means 107 prepare it (step S3).

Figure 7:
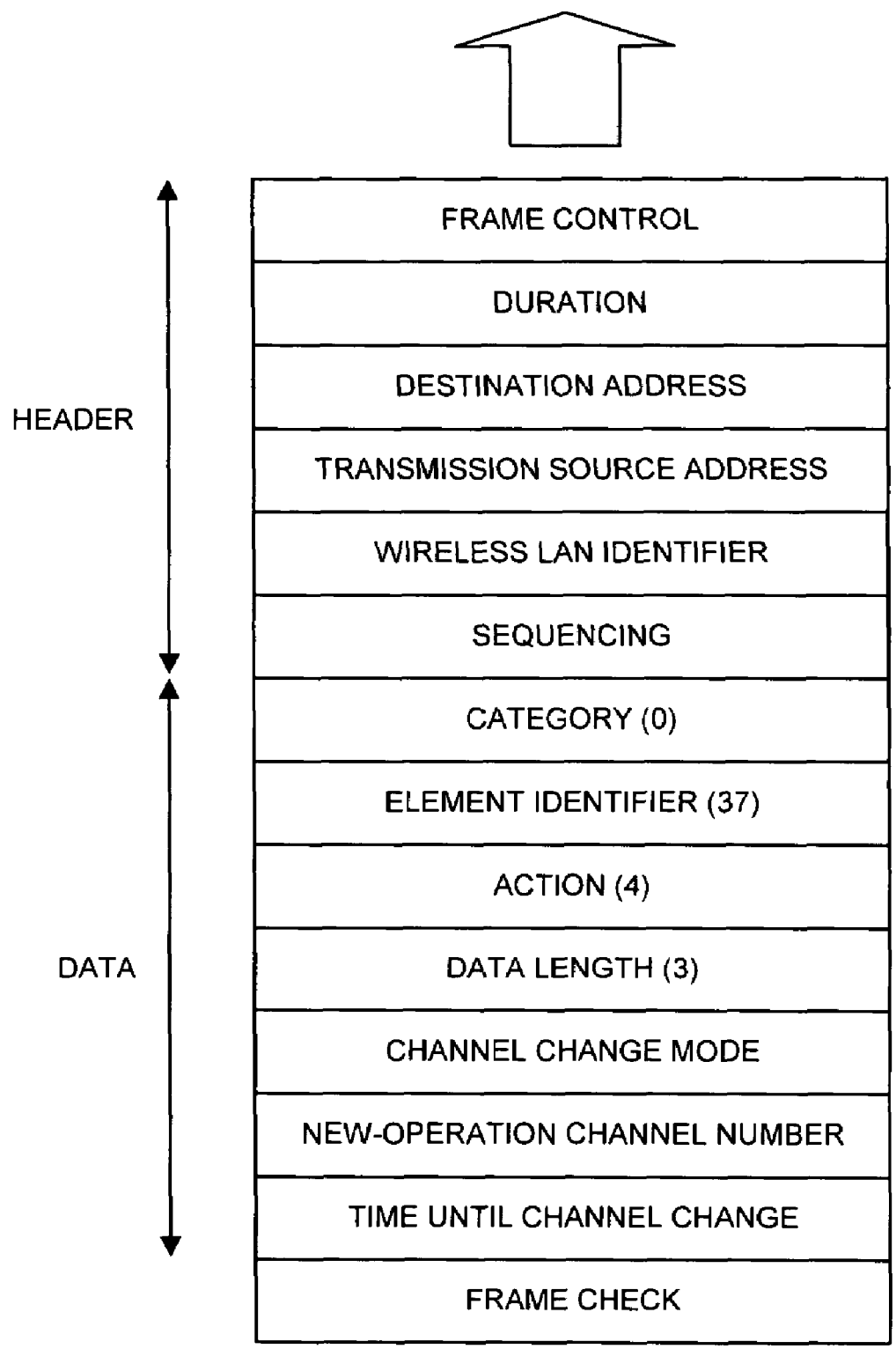
FIG. 7 is a view illustrating an example of the channel change message from the AP to the terminal.

An example of a frame format of the channel change notification message in this case is shown in FIG. 7. This message is sequentially transmitted with the time lapse, in the order of fields to be shown in the upper part to fields to be shown in the lower part. A predetermined value is filed in a destination address field to the wireless terminal of this frame (a third one from the upper side of the figure), a new-operation channel number field (a third one from the lower side of the figure), and a time field until the channel change (a second one from the lower side of the figure) respectively, and is transmitted. The other fields have a tenuous relation with the present invention, so its explanation is omitted.

Subsequently to this process, the channel change notification message transmission management means 109 set the initial value T0 of the time until the channel change for the channel change timer of the channel change time management means 108 (step S4). The channel change notification message prepared in the step S3 is transmitted via the MAC section 102 and the PHY section 101 from the antenna section 100 (step S5). Thereafter, if it is not determined that the channel change timer expired (step S6), the operation moves to a step S8, and if the timer expired (step S6), the channel change notification message transmission management means 109 perform the channel change process (step S7). When the channel change process was completed, the operation moves to the step S1.

And, the interference detection means 105 determine whether or not the channel should be changed in order to avoid the interference, based upon the interference detection result (step S8). In a case it determined that the channel had to be changed, after the interference detection means 105 requested the channel change process of the channel change notification message transmission management means 109, the operation moves to a step S11. Herein, the channel change notification message transmission management means 109 decide to assume the time until the channel change to be a time equal to or less than the remaining time until the channel change that the channel change time management means 108 indicate (it may be zero), and decide to assume the channel that becomes a change destination to be a channel identical to the change destination channel filed within the channel change notification message transmitted just previously.

At this moment, the reason why the time until the channel change is set to a short value including 0, which is equal to or less than the current timer value, is that the channel change is performed quickly responding to the interference occurrence. Also, a setting can be made so that the time until the channel change becomes [identical to the channel change time set in the message before the interference occurrence]. Doing so allows all terminals (including not only the terminals that were not able to receive the message due to the interference, but also the terminals that were able to receive it) within an identical area to make a switchover to an identical channel at an identical timing.

On the other hand, in a case where it was not determined in the step S8 that the channel had to be changed, the channel change notification message transmission management means 109 determine whether a timing at which the channel change notification message was transmitted was reached, by making a reference to the remaining time until the channel change that the channel change time management means 108 manage (step S9). If a timing at which the channel change notification message was transmitted was reached, the operation proceeds to a step S10, and if its timing was not reached, the operation proceeds to the step S6.

In the step S10, the channel change notification message transmission management means 109 decide to assume the time until the channel change to be filed in the channel change notification message that is newly prepared to be a time longer than the remaining time until the channel change that the channel change time management means 108 indicate (the initial value T0 was set in an example of FIG. 2), and decide to assume the channel that becomes a change destination to be a channel of which the interference level to be obtained from the channel quality storage section 106 is lowest.

Continuously, an operation of the wireless terminals 12 and 13 will be explained, by employing FIG. 6. When the power source is applied to the wireless terminals 12 and 13, they determine whether the channel change message was received (step S61). In a case where no channel change message was received, they confirm whether the value was set for the channel change timer (step S62), and in a case where the value was not set yet, the operation returns to the step S61; however in a case where the value was already set, the operation proceeds to a step S64.

On the other hand, when the wireless terminal 12 and 13 determined that the message was received in the step S61, they extract the change destination channel and the time until the channel change to be filed in its message, and file these in the change destination channel storage section 206 and the channel change time management means 207 respectively (step S63).

Thereafter, the wireless terminal 12 and 13 determine whether the value of the channel change timer expired (step S64), if it did not expire, the operation proceeds to the step S61, and if it expired, they make a change to the channel stored in the change destination channel storage section 206 (step S65). If this channel change process is completed, the operation proceeds to the step S61.

As explained above, in this embodiment, the AP transmits the channel change notification message prior to occurrence of the interference, thereby allowing the wireless terminal that failed to receive the channel change notification message at the time of the interference occurrence to make a channel change without causing a connection to the AP to be disconnected.

Embodiment 2

As the case may be, the interference status is improved during the time until the channel change is executed since the interference detection in the foregoing first embodiment. A necessity for the channel change is lost in such a case, so a technique adapted to continuously use a channel identical to the channel before the interference detection is a second embodiment.

Figure 8:
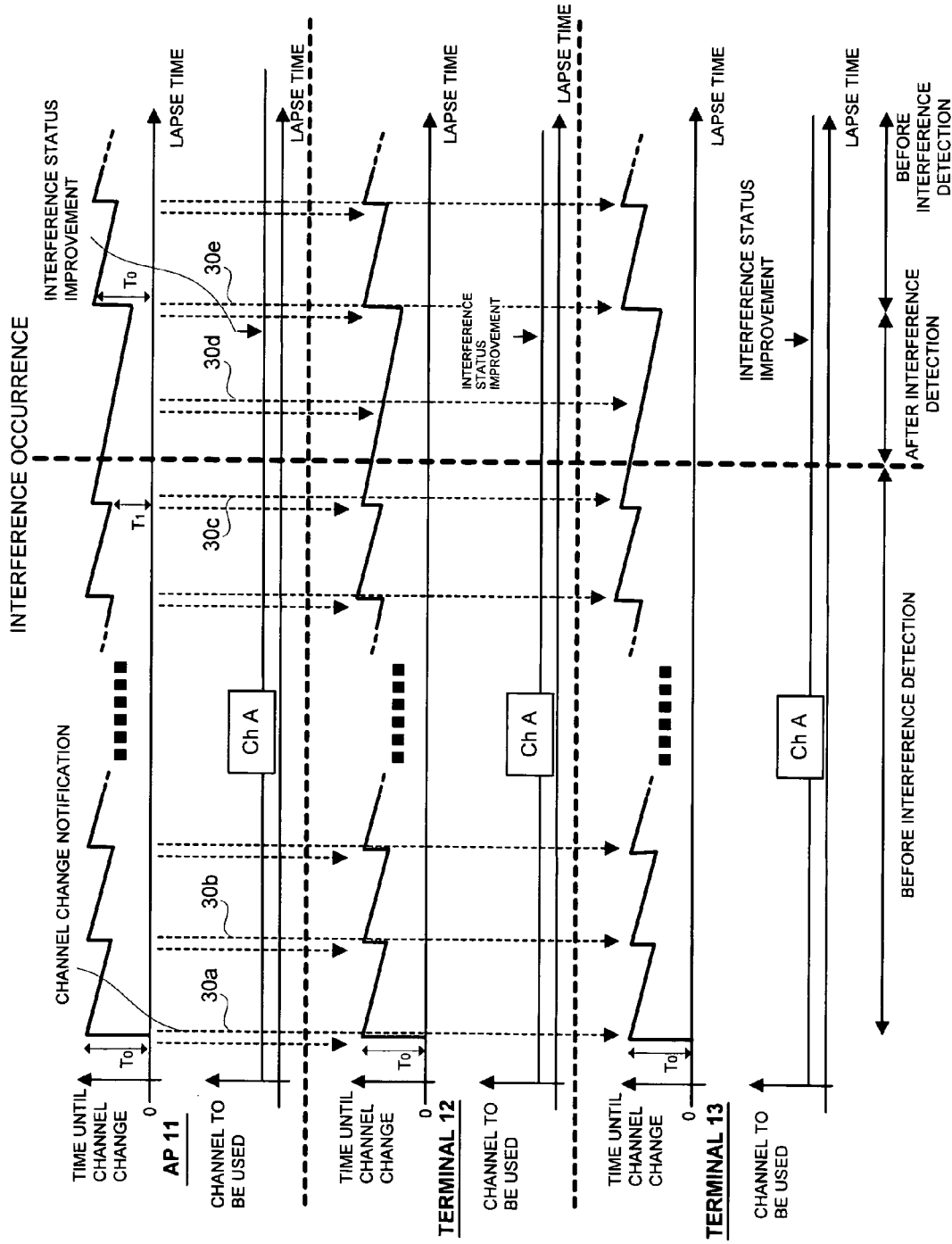
FIG. 8 is a view illustrating an example of the channel change method in the second embodiment.

FIG. 8 is a timing chart illustrating an operation of the second embodiment of this FIG. 2, and parts identical to that of FIG. 2 are indicated with identical codes. By making a reference to FIG. 8, after the interference detection, the AP 11 transmits the channel change notification message 30d to the terminals 12 and 13; however when the interference status is improved within the channel change time by this message 30d, the interference detection means 105 (see FIG. 3) detect this, and make an operation so that the time until the channel change, which is a time longer than the current timer value, for example, the value assumed to be an initial value T0 in an example of FIG. 8 is set for the channel change notification message 30e that is next transmitted. This leads to a return to the status before the interference. Additionally, an operation in the wireless terminals 12 and 13 of the second embodiment is identical to that of the first embodiment.

Figure 5:
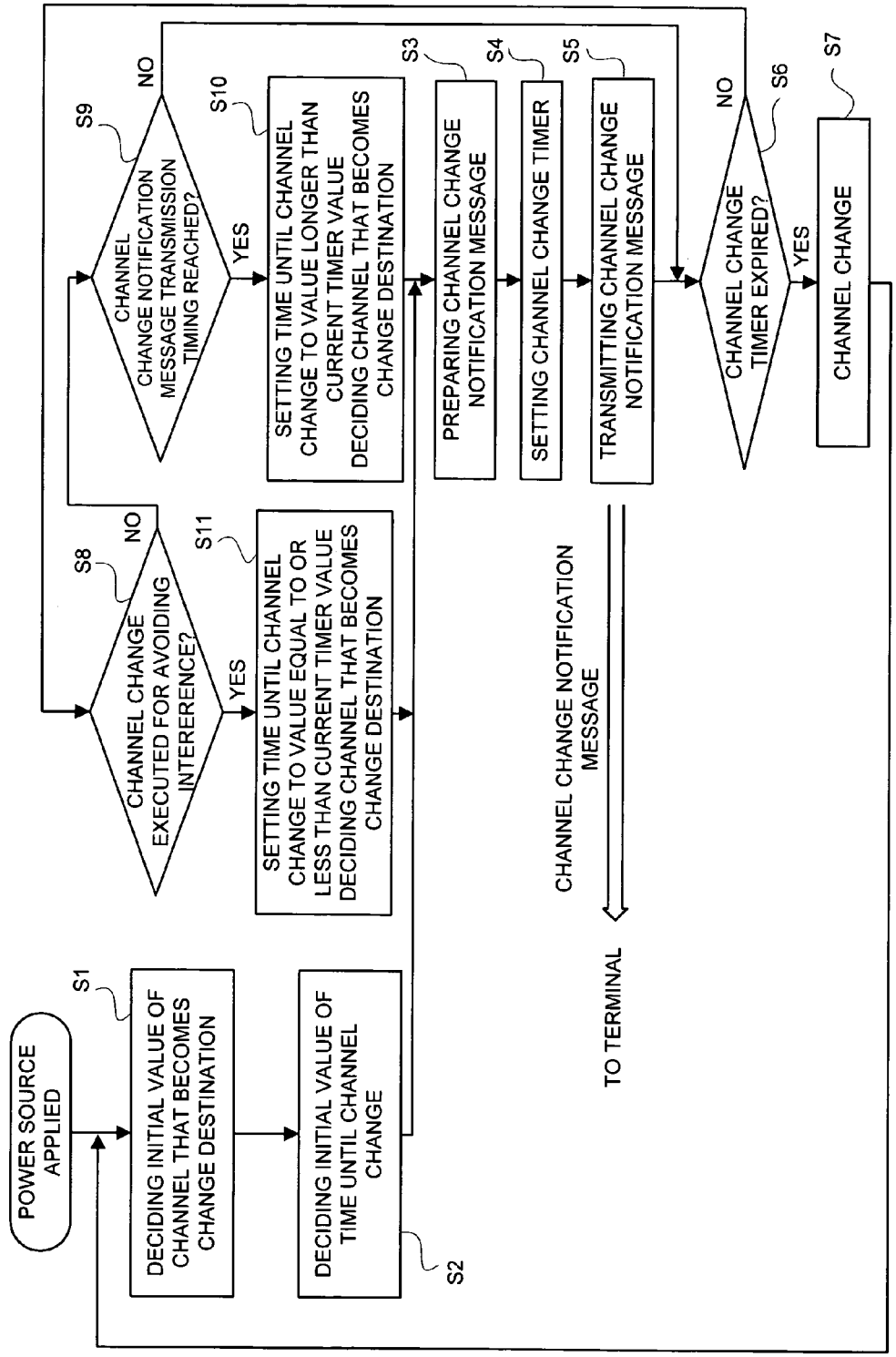
FIG. 5 is a flowchart illustrating the operation of the AP of the first embodiment.
Figure 6:
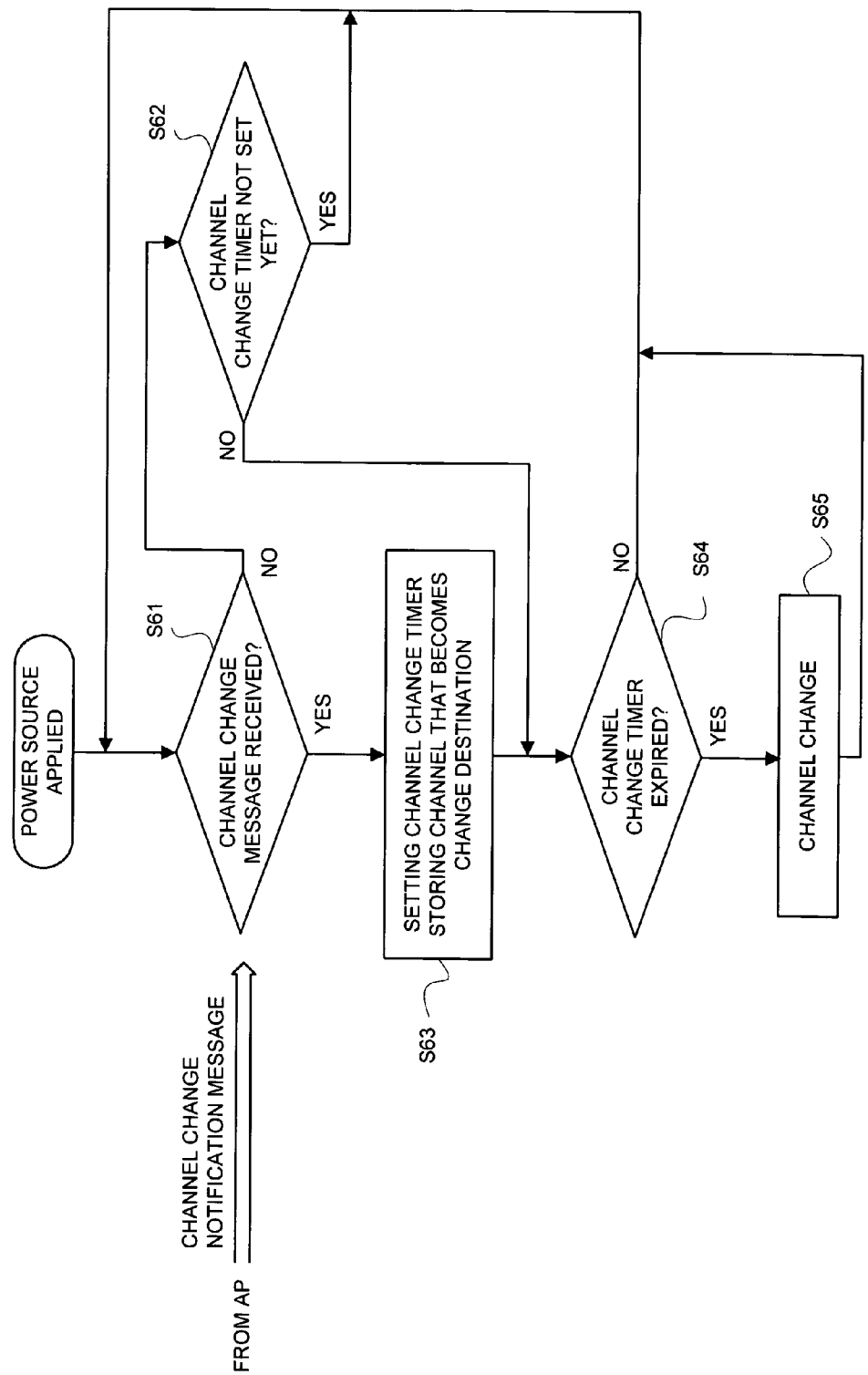
FIG. 6 is a flowchart illustrating the operation of the terminal of the first embodiment.
Figure 9:
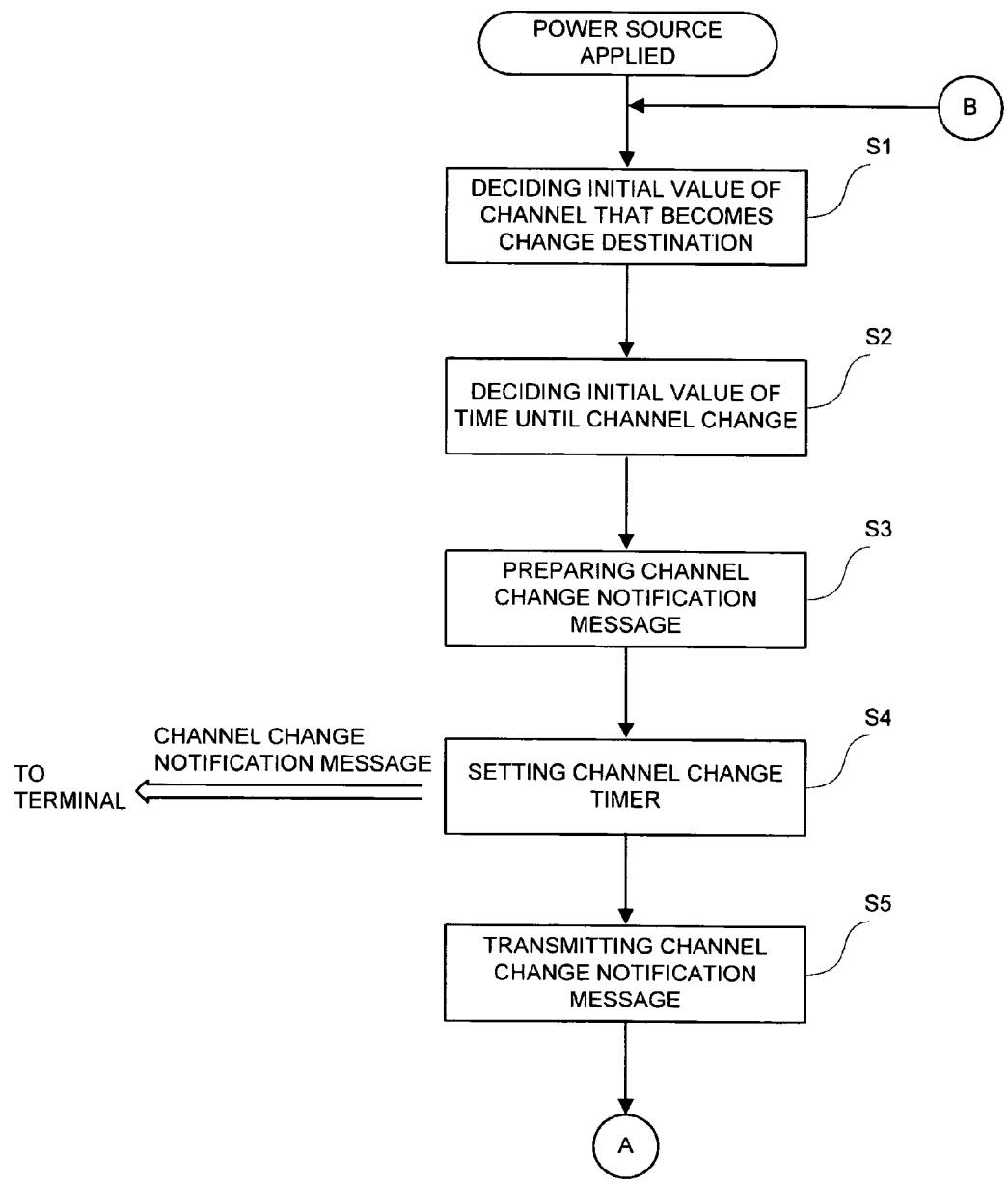
FIG. 9 is a flowchart illustrating one part of the operation of the AP of the second embodiment.
Figure 10:
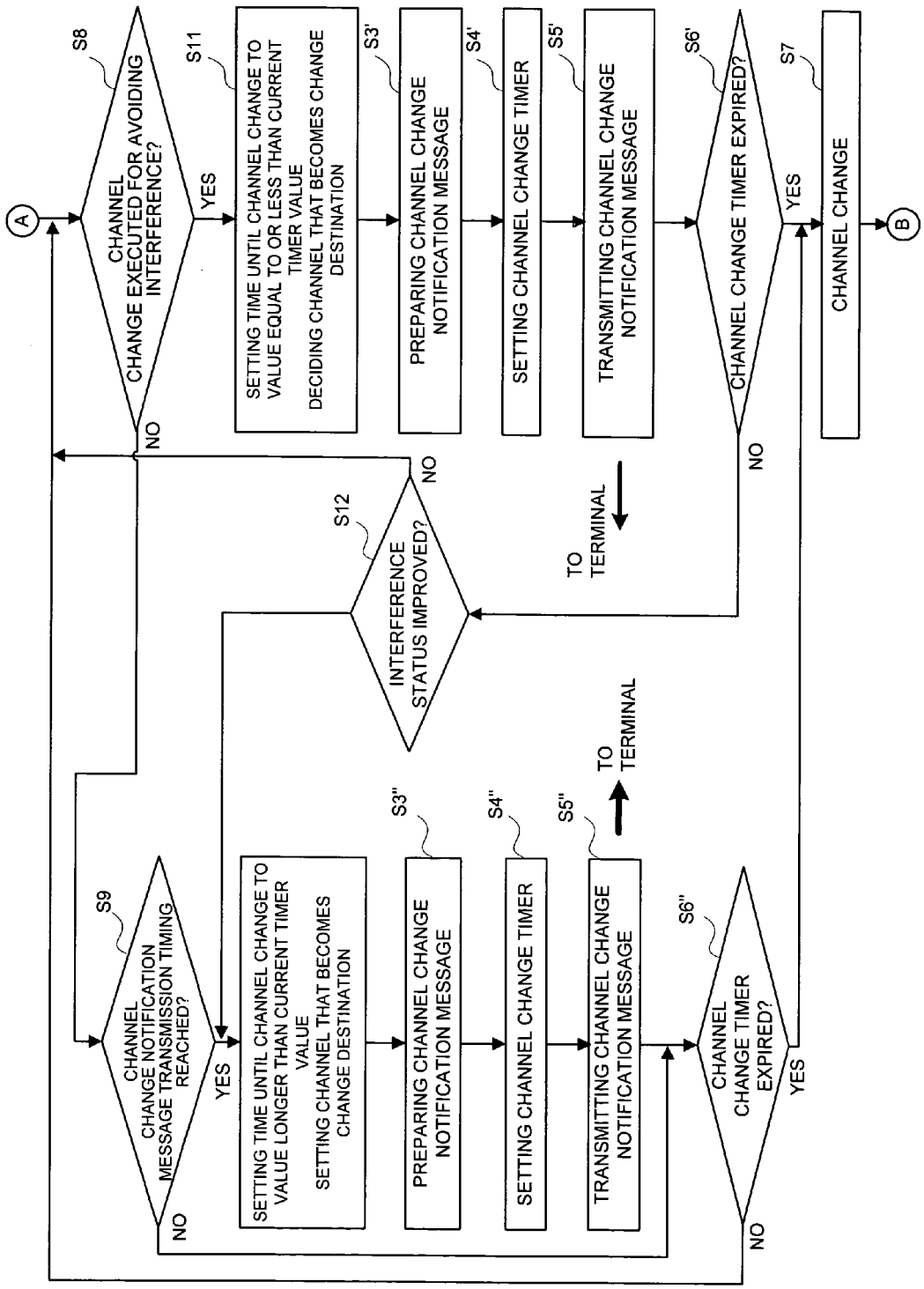
FIG. 10 is a flowchart illustrating one part of the operation of the AP of the second embodiment.

FIG. 9 and FIG. 10 are flowcharts illustrating an operation of the AP 11 in this embodiment, and steps identical to that of FIG. 5 are indicated with identical codes. In this embodiment, in a step S8, when a necessity occurs for executing the channel change in order to avoid the interference, similarly to a case of FIG. 5, in a step S11, the AP 11 sets the time until the channel change to a value equal to or less than the current timer value (in FIG. 8, the current timer value), and decides the change destination channel. And, it executes procedures of step S3' to S5', that is, the steps of the channel change notification message preparation, the channel change timer setting, and the channel change notification message transmission, and if the timer expired (YES in a step S6'), it executes the channel change (step S7), and the operation returns to the step S1; however if the timer did not expire in the step S6', it determines whether the interference status was improved (step S12). If the interference status was not improved, it continues the operation at the time of the interference occurrence.

As described above, in the flowchart of FIG. 10, in a case where the interference status was not improved, the operation at the time of the interference occurrence is continued; however it is also possible to assume the following operation as a case other than this. That is, in a case where the interference status is not improved (NO in a step S12), it is also possible to assume such an operation that only observation as to whether or not the interference status is improved is made repeatedly at an appropriate timing until the timer expires, and that the operation at the time of the interference occurrence is not continued. Notwithstanding such an operation, the channel is changed if the timer expires, whereby its objective can be accomplished.

Herein, if the interference status was improved, the operation proceeds to a step S10. In this step S10, setting the time until the channel change to a value longer than the current timer value (as described above, the initial value T0 in an example of FIG. 8) to transmit the message 30e to the terminal (step S5") leads to a return to the operational status before the interference occurrence.

Embodiment 3

Next, a third embodiment of the present invention will be explained. In this embodiment, the channel change notification message is transmitted before the interference occurrence, and the transmission of the channel change notification message is not made after the interference occurrence. Making a channel change notification in advance before the interference occurrence aims at enhancing the provability that the channel change notification message is received in the wireless terminal.

Figure 11:
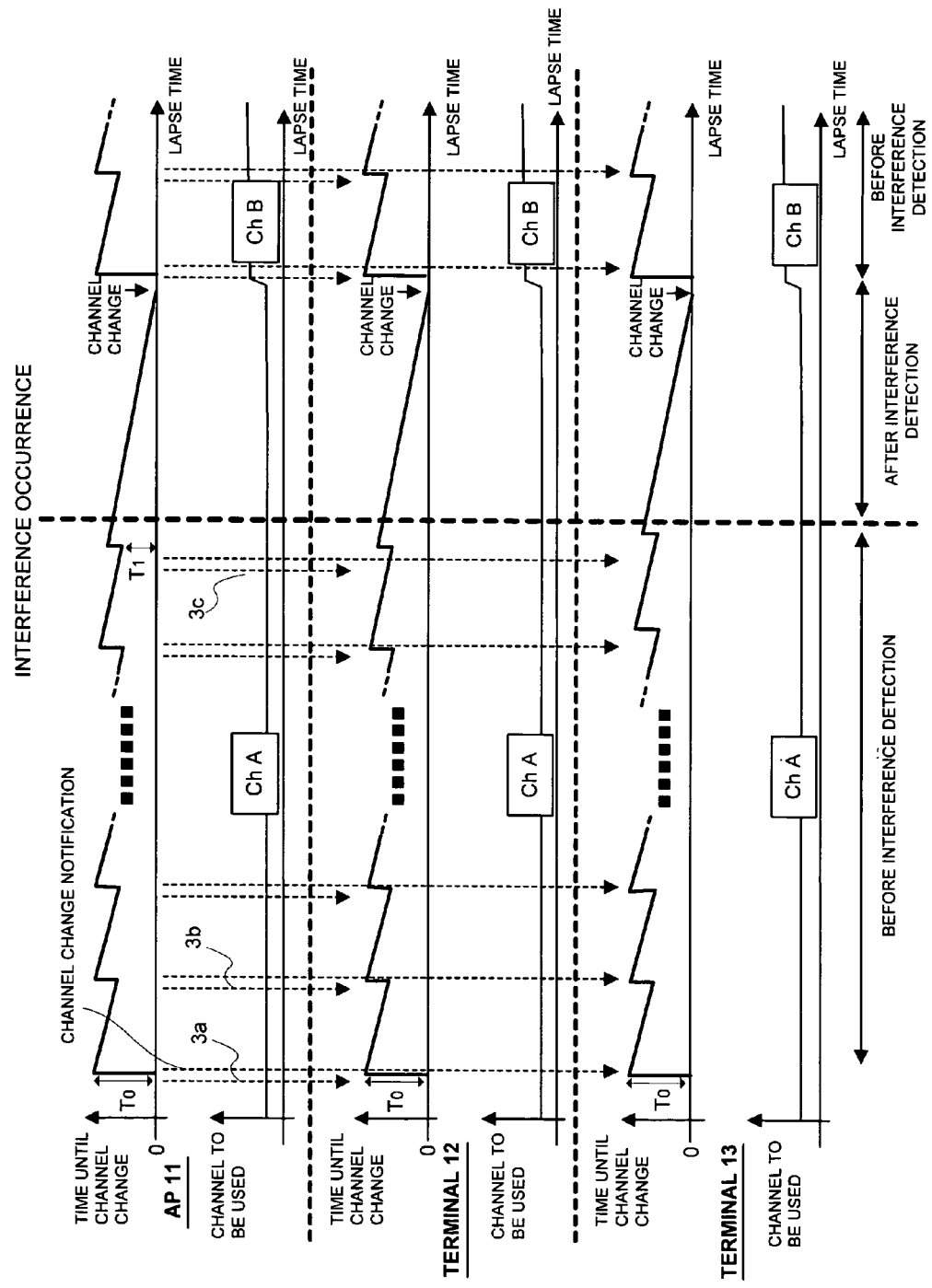
FIG. 11 is a view illustrating an example of the channel change method in the third embodiment.
Figure 12:
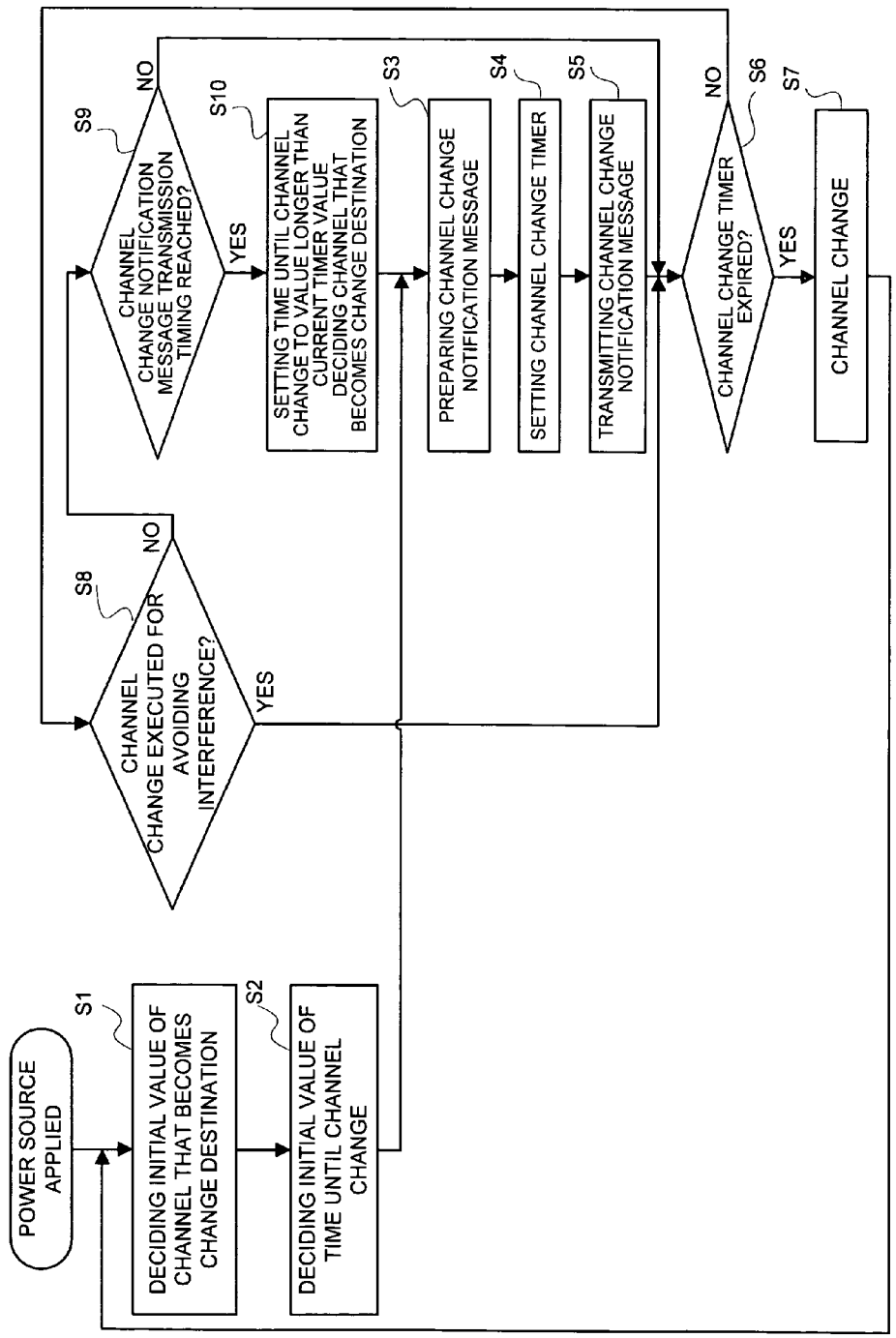
FIG. 12 is a flowchart illustrating one part of the operation of the AP in the third embodiment.

FIG. 11 is a timing chart illustrating an operation of this embodiment, and parts identical to that of FIG. 2 are indicated with identical codes. FIG. 12 is a flowchart illustrating an operational procedure of the AP 11 of this case, and steps identical to that of FIG. 5 are indicated with identical codes. By making a reference to these FIG. 12 and FIG. 13, in this embodiment, the AP 11 has an operation identical to that of the first embodiment shown in FIG. 2 and FIG. 5 before the interference occurrence; however after the interference occurrence, the AP 11 stops transmitting the channel change notification message, has a wait for expiration of the timer, and executes the channel change.

Accordingly, the process of the step S11 in the flowchart of FIG. 5 is done away with, and as shown in FIG. 12, in a case where YES was determined in the process of step S8, the operation comes into a status of having a wait for the expiration of the channel change timer, i.e. it moves to the step S6. Also in this case, the operation in the wireless terminal 12 and 13 is identical to that of the first embodiment.

Embodiment 4

Next, a fourth embodiment of the present invention will be explained. In this embodiment, the AP 11 is adapted to transmit the channel change notification message plural times to the wireless terminals 12 and 13 only after the interference occurrence. Doing so allows the provability that the channel change notification message reaches all wireless terminals to be raised.

Figure 13:
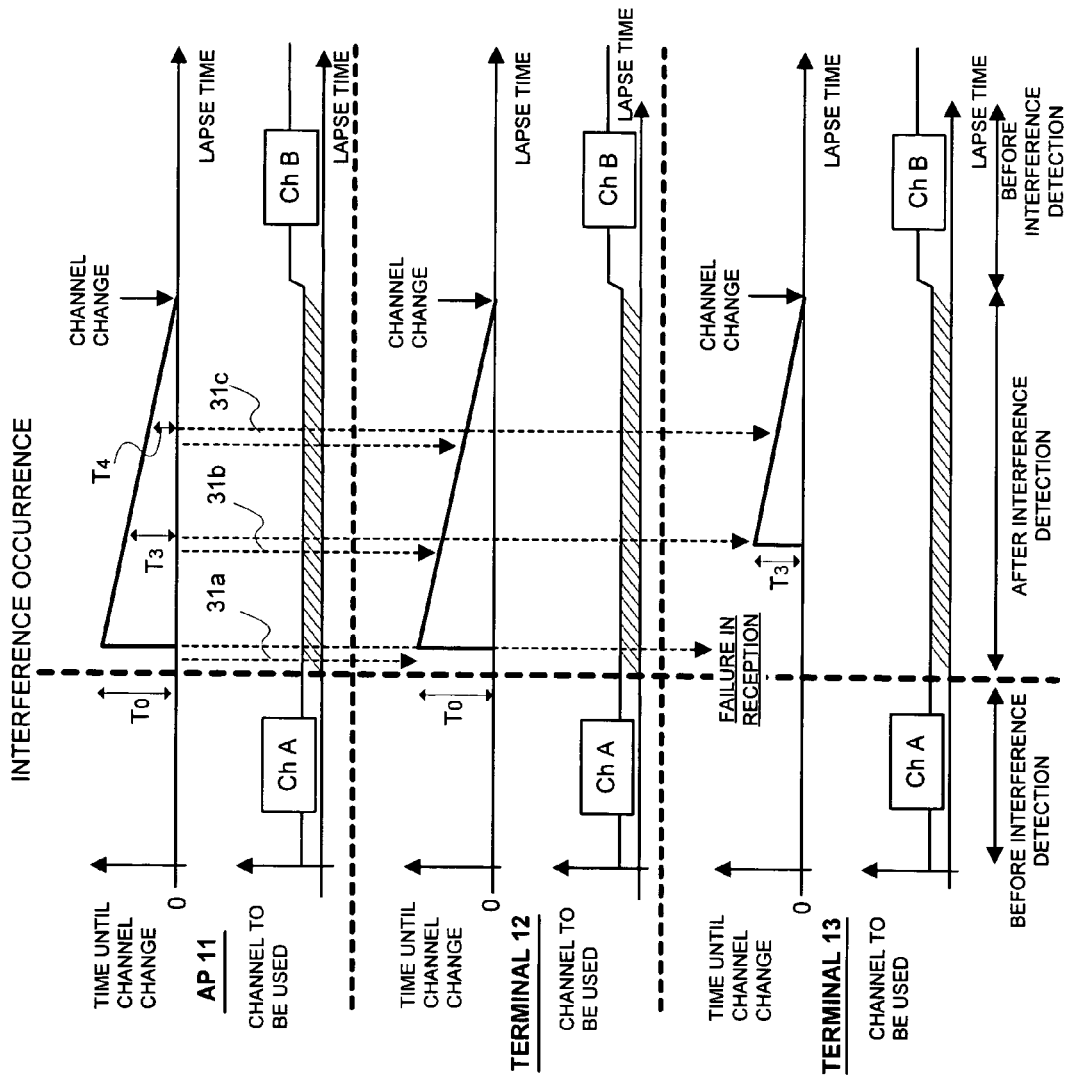
FIG. 13 is a view illustrating an example of the channel change method in the fourth embodiment.

FIG. 13 is an operational timing chart of this third embodiment, and parts identical to that of FIG. 2 are indicated with identical codes. An operation of the AP 11 in this case is shown in a flowchart of FIG. 14.

Figure 14:
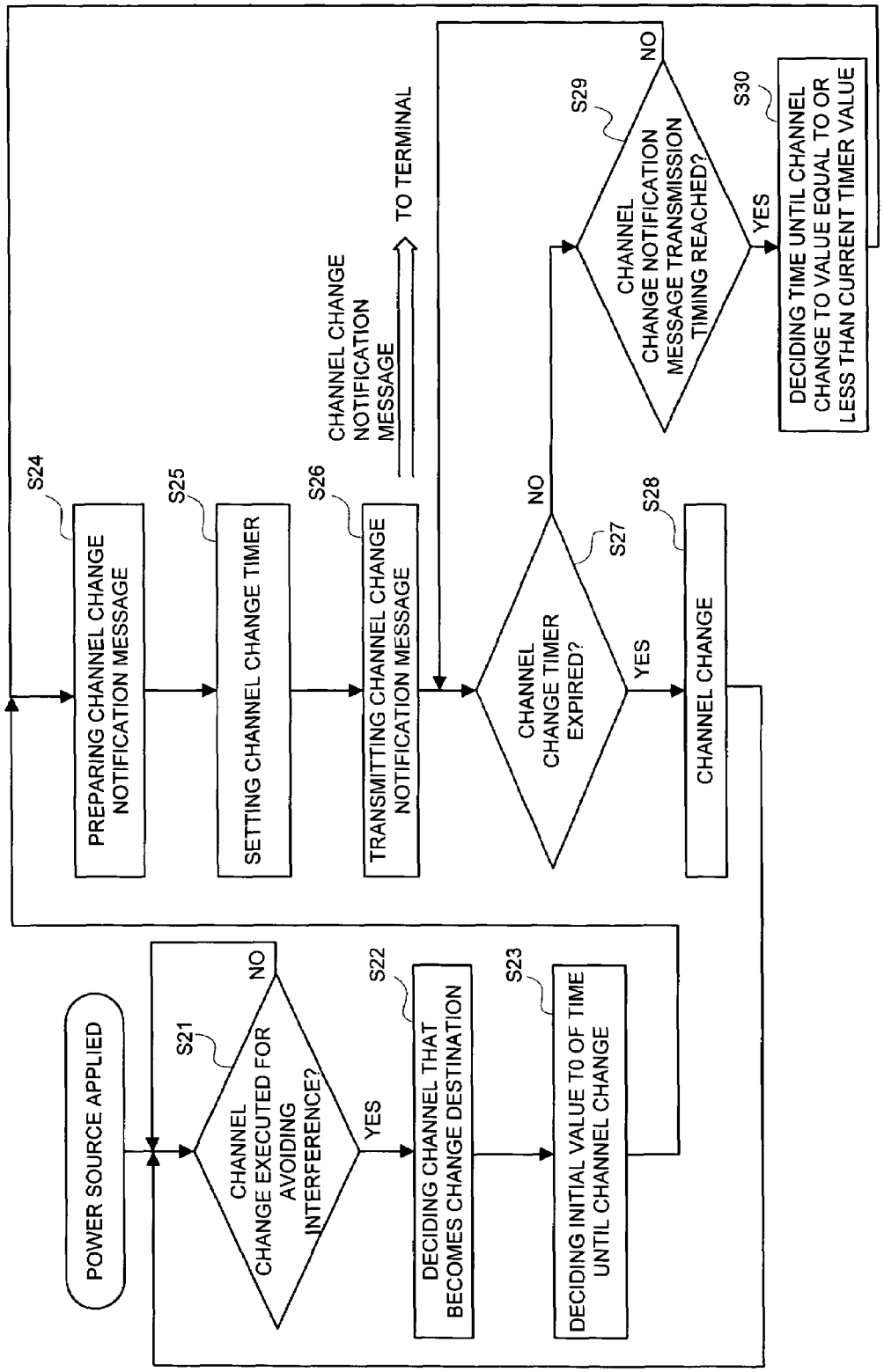
FIG. 14 is a flowchart illustrating one part of the operation of the AP of the fourth embodiment.

By making a reference to these FIG. 13 and FIG. 14, the AP 11 observes the interference occurrence status responding to application of the power source. And, when the interference was detected, and the AP 11 determines that the channel change has to be executed in order to avoid the interference (YES in a step S21), decides the channel that becomes a change destination after the interference occurrence (Ch B in FIG. 13) (step S22), and decides the initial value T0 of the time until the channel change (step S23).

Next, the channel change notification message is prepared (step S24). At this moment, the change destination channel decided in the step S22 is set for the new-operation channel number field (see FIG. 7) of this message, and the initial value T0 decided in the step S23 is set for the time field until the channel change. The initial value T0 is set for the channel change timer (step S25), and this message 31a is transmitted to the wireless terminals 12 and 13 (step S26).

Next, it is checked whether or not the channel change timer expired, and in a case where it did not expire (NO in a step S27), it is checked whether or not the channel change notification message transmission timing was reached (step S29). Herein, the channel change notification message transmission timing is a value (timing) that is decided arbitrarily, and in FIG. 13, the timing at which the messages 31b or 31c are transmitted is equivalent to the channel change notification message transmission timing. In a case where the channel change notification message transmission timing was reached (YES in the step S29), it is decided that the time until the channel change is assumed to be a value equal to or less than the current timer value (T3 in FIG. 13) (step S30), the channel change notification message 31b is prepared again (step S24), and the channel change timer is reset (step S25), and the channel change notification message 31b is transmitted to the wireless terminal (step S26). Also, if the timer expired in the step S27, the channel change is executed (step S28). Additionally, the operation in the wireless terminals 12 and 13 of the fourth embodiment is identical to that of the first embodiment.

Embodiment 5

Next, a fifth embodiment of the present invention will be explained. In this embodiment, the AP and the wireless terminal are adapted to pre-investigate the interference status of the channel jointly in order to decide the channel change destination. An investigation method of the interference status in this case is a method where the AP and the wireless terminal move to the channel that is an object of investigation for a short time, and detect the interference status, so the communication between the AP and the wireless terminal becomes impossible to make during this investigation period; however so far as the above period is set to a short period, as a matter of fact, no problem exists.

And, based upon this investigation result of the interference status, it is decided that the channel of which the interference status is most excellent is assumed to a change destination channel, and the AP gives an instruction to the terminal with the channel change notification message.

Figure 15:
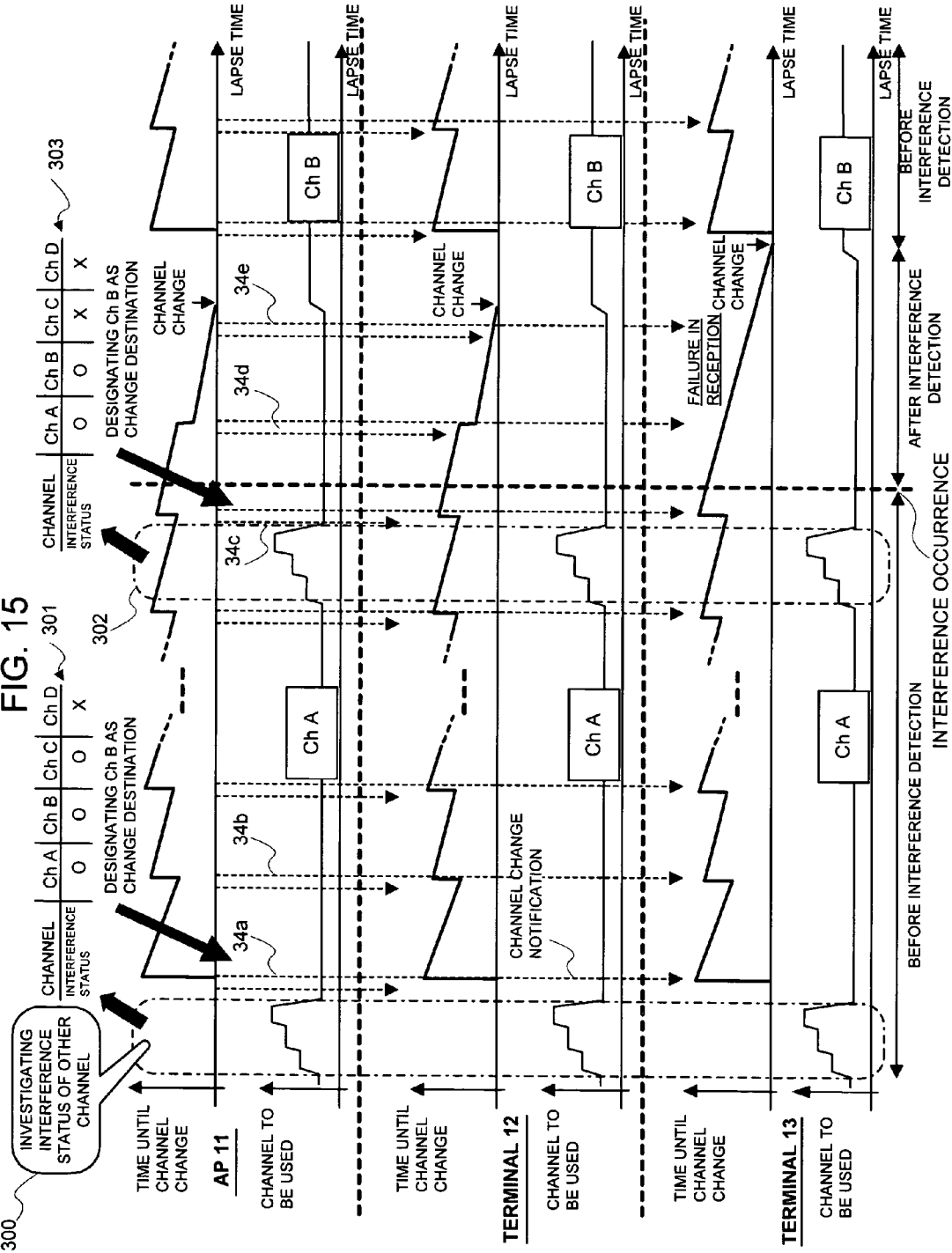
FIG. 15 is a view illustrating an example of the channel change method in the fifth embodiment.
Figure 16:
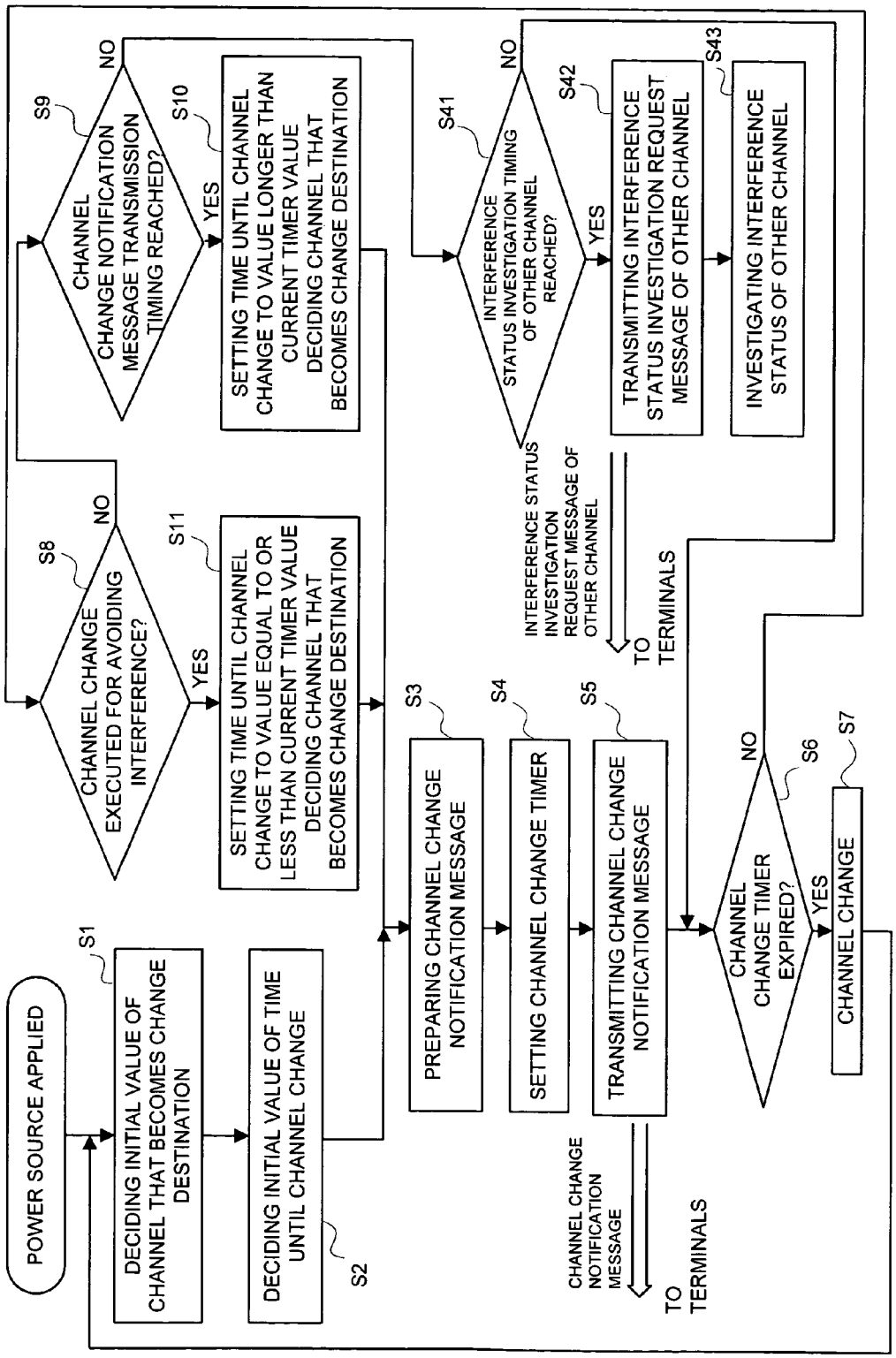
FIG. 16 is a flowchart illustrating one part of the operation of the AP of the fifth embodiment.
Figure 17:
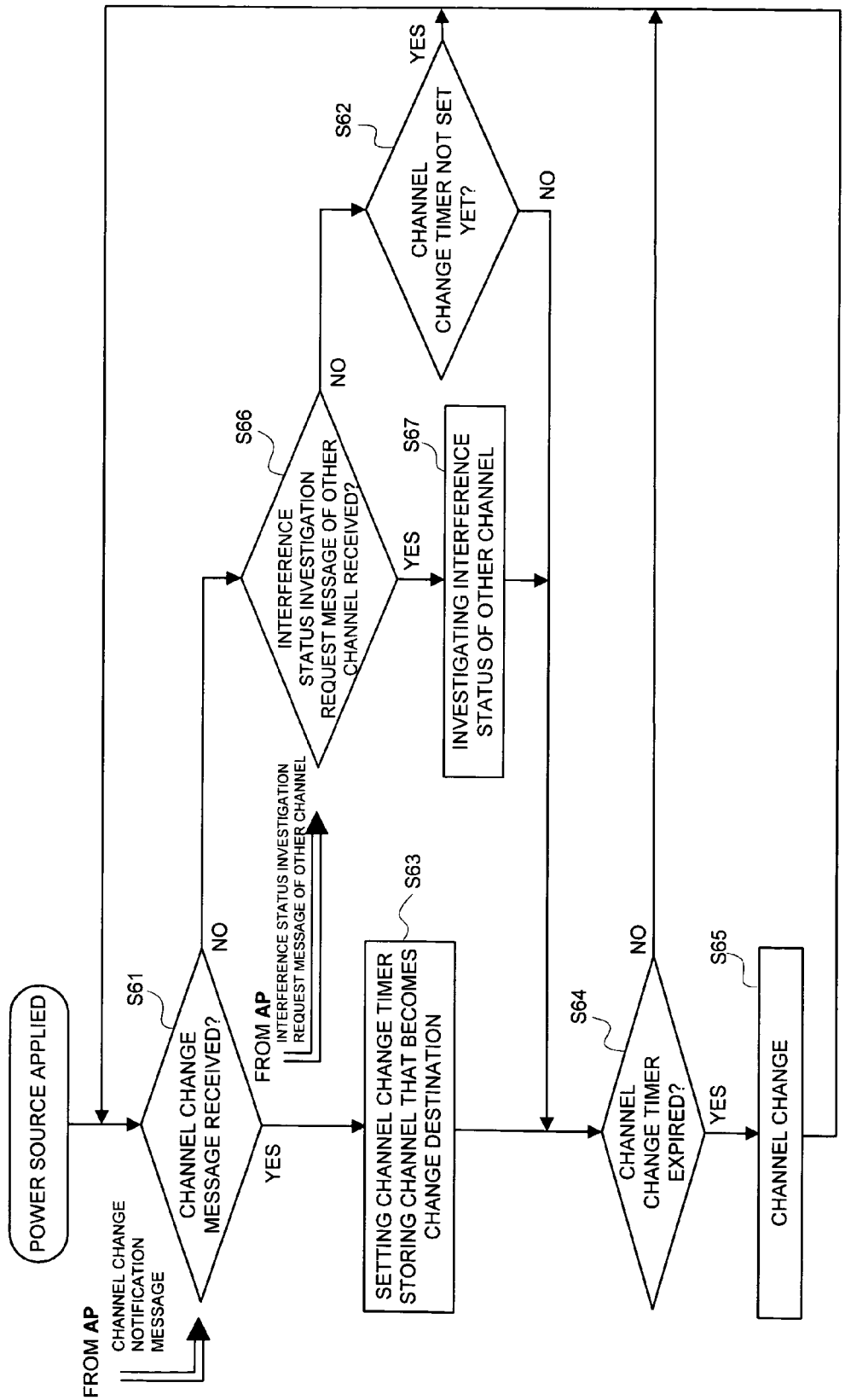
FIG. 17 is a flowchart illustrating one part of the operation of the terminal of the fifth embodiment.

FIG. 15 is a timing chart in this case, FIG. 16 is an operational flowchart of the AP 11, and FIG. 17 is an operational flowchart of the terminal. In FIG. 16 and FIG. 17, steps identical to that of FIG. 5 and FIG. 6 are indicated with identical codes. In FIG. 15, in interference status investigation periods 300 and 302 of the other channel, the AP 11 gives the terminal an instruction for sequentially changing the channels (in FIG. 15, Ch B to Ch D) other than the channel that is being used actually for a predetermined short period, and investigates the interference status.

As shown in the flowchart of FIG. 16, in a case where the channel change notification transmission timing was not reached in a step S9, the AP 11 transmits an other-channel interference status investigation request message to the terminal (step S42) when the channel interference status investigation timing was reached (step S41). And, it investigates the interference status of the other channel (step S43).

By making a reference to the flowchart of FIG. 17, in a case where the channel change message was not received in a step S61, when each of the terminals 12 and 13 receives the other-channel interference status investigation request message (step S66), it investigates the interference status of the other channels (step S67). At this moment, an instruction to the effect that the channel is sequentially changed to Ch B to Ch D for a pre-decided short period in order to investigate the interference status is included in the above other-channel interference status investigation request message, whereby the channel is sequentially switched and controlled based upon it, thus allowing the interference status to be investigated.

Each of the terminals 12 and 13 can measure an interference amount of the channel that can be used for communication in investigating the interference status in a step S67, and this function, which is known, is not shown in the figure specially; however for example, a function is listed of detecting a control signal of the wireless system that becomes an interference source with a scan that is a function that the wireless LAN system of the 802.11 standard has.

In an example shown in FIG. 15, if it is assumed that such a investigation result as shown in 301 was obtained in the interference status investigation period 300 of the other channel, the channel (herein, Ch B) other than Ch D is decided as a channel change destination at this moment. And, when the interference occurs in Ch A that is a channel that is being used actually, a channel change to Ch B is executed. In the interference status investigation period 302 of the other channel after it, if it is assumed that such a investigation result as shown in 303 was obtained, Ch B is decided as a channel change destination at this moment.

Embodiment 6

Next, a sixth embodiment of the present invention will be explained. In this embodiment, in order to decide the channel change destination, similarly to the fifth embodiment, the AP and the terminal are adapted to investigate the interference status of the channel jointly. An investigation method of the interference status in this case is a method where, in the channel to be actually used for communication, which is a channel that is an object of investigation, the AP and the wireless terminal detect its interference status, and the communication between the AP and the wireless terminal can be made during this investigation period as well.

And, based upon this investigation result of the interference status, it is decided that the channel of which the interference status is most excellent is assumed to be a change destination channel, and the AP gives an instruction to the terminal with the channel change notification message.

Figure 18:
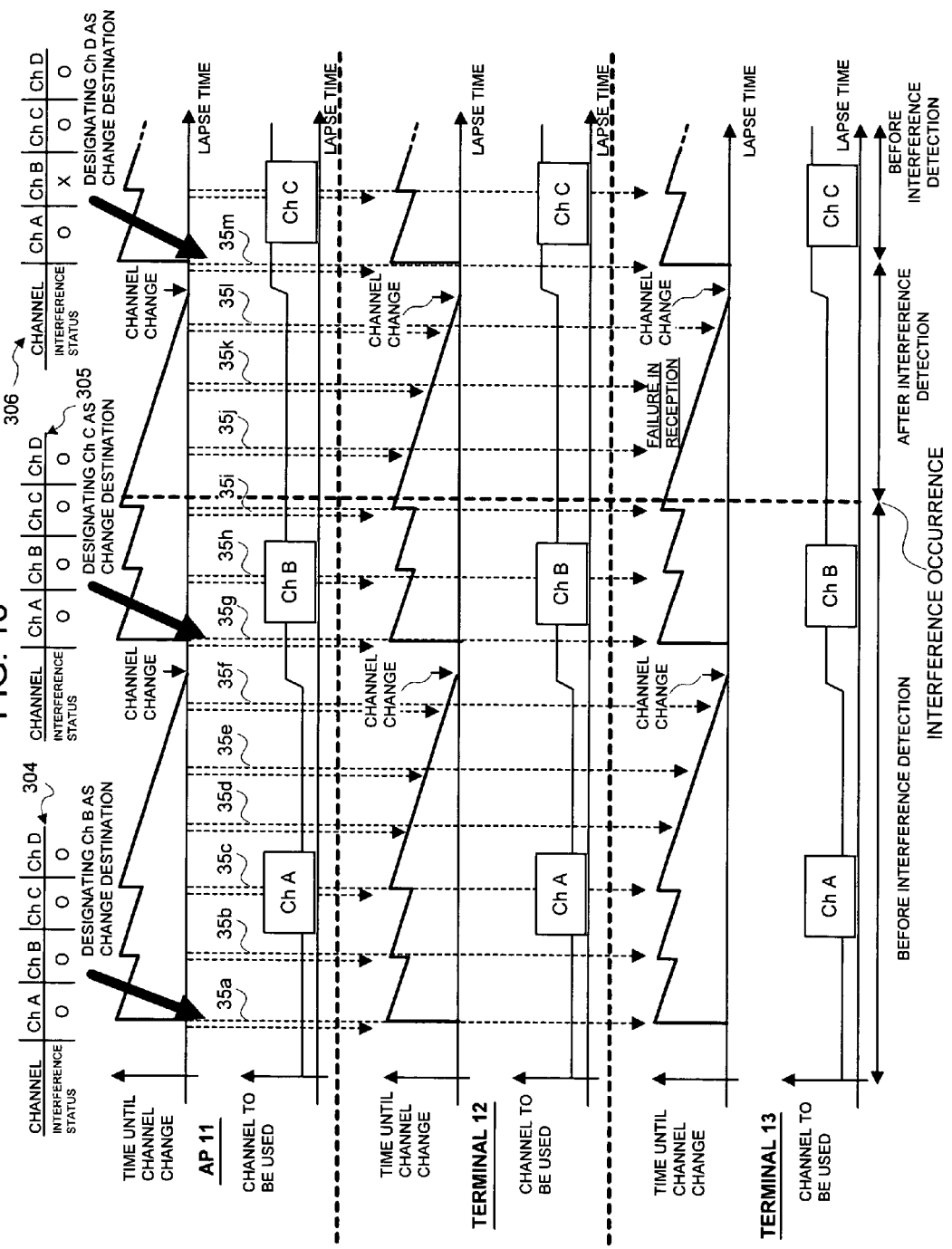
FIG. 18 is a view illustrating an example of the channel change method in the sixth embodiment.
Figure 19:
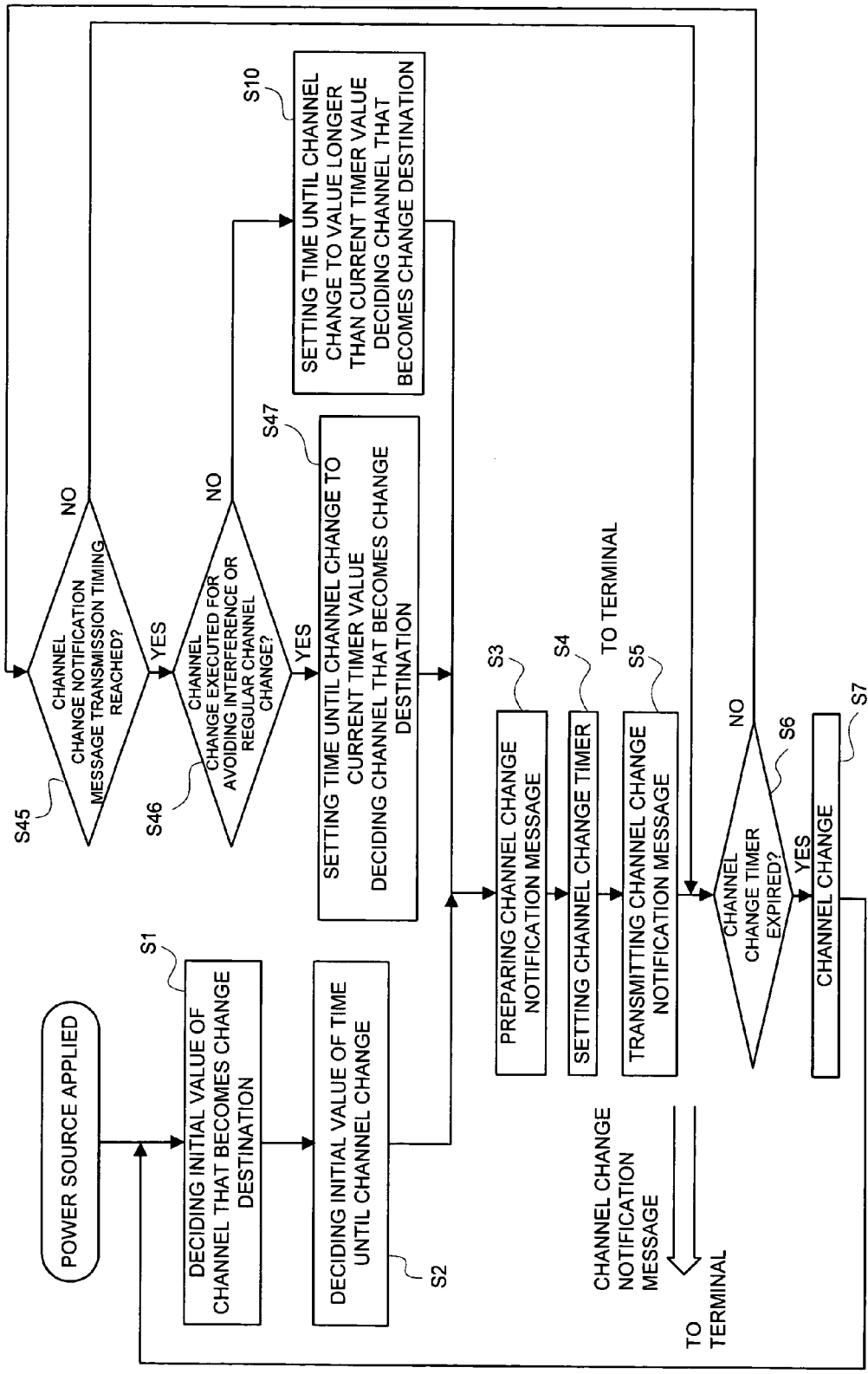
FIG. 19 is a flowchart illustrating one part of the operation of the AP of the sixth embodiment.

FIG. 18 is a timing chart in this case, and FIG. 19 is an operational flowchart of the AP 11. In FIG. 19, steps identical to that of FIG. 5 are indicated with identical codes. Additionally, in this embodiment, an operation of the terminal works identically to the flowchart of FIG. 6.

In a case where the channel change timer did not expire in a step S6 of FIG. 19, it is determined whether the channel change notification message transmission timing was reached (step S45), if it was reached, that is, if the channel change timing for avoiding the interference, or for a regular channel change (for the interference status investigation) was reached (step S46), the time until the channel change is set to a current timer value, and the channel that becomes a change destination is decided (step S47).

In an example of FIG. 18, timings 35d, 35e, and 35f are channel change timings for the regular channel change (for the interference status investigation). The interference status investigation result at each of these timings is shown in 304, 305, 306 of FIG. 18 respectively. The AP 11 decides that the channel of which no (little) interference exists is assumed to a change destination channel, based upon this investigation result. The investigation of the interference status in this case is carried out in the channel that the AP and the terminal use actually for communication, as described before, so the interference status investigation is carried out at any time.

The investigation of the interference status in this case is carried out, by employing an interference amount monitor signal to determine a degree of the interference; however a received power of the radio signal transmitted from wireless appliances that do not belong to the wireless LAN system 10 (see FIG. 1) is applied as this interference amount monitor signal. For example, these wireless appliances that do not belong to the wireless LAN system 10 transmit a signal of the channel identical to the channel to be used for communication in this wireless LAN system 10, and when a level at which the above signal is received in its apparatus amounted to a certain value or more, it is determined that the interference occurred. Also, the other signal as well, which is a kind of a signal of which size of the interference amount can be determined, may be employed.

Embodiment 7

Figure 20:
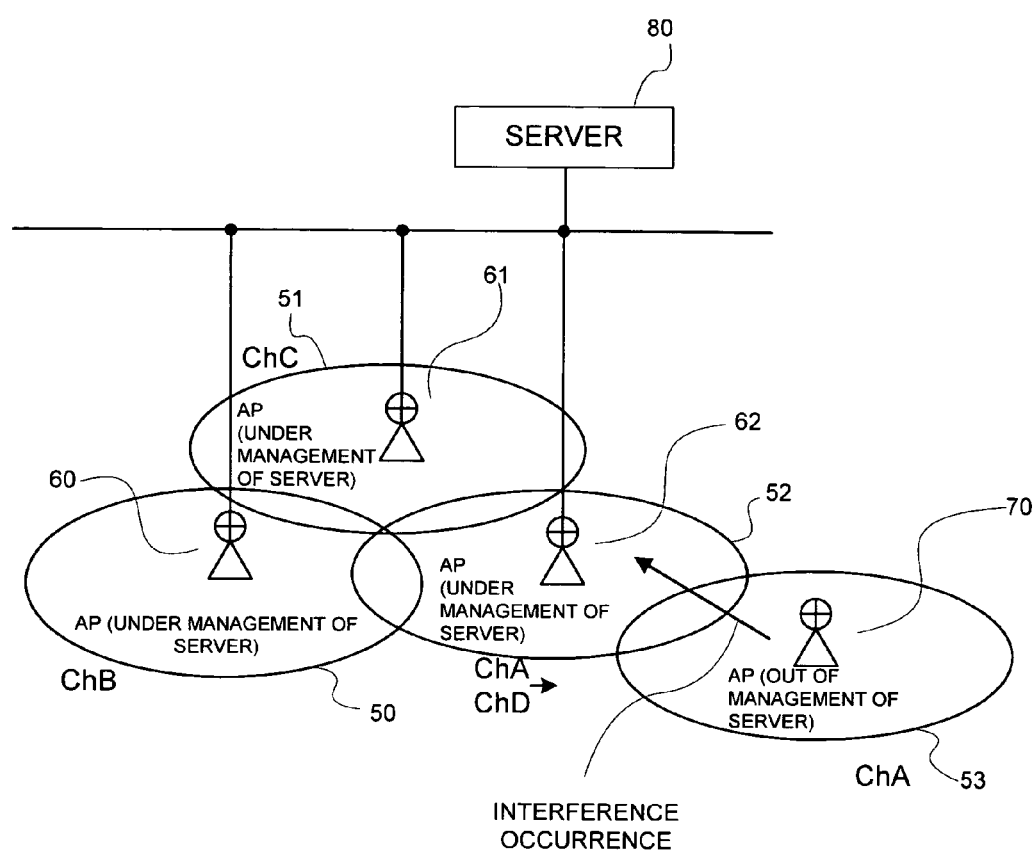
FIG. 20 is a system configuration view of the seventh embodiment.

Next, a seventh embodiment of the present invention will be explained. In each of the above-mentioned embodiments, the AP investigates and manages the interference status of each channel, and makes a decision of the channel change destination based upon its result; however, as shown in FIG. 20, in this embodiment, a server 80, which manages a plurality of APs 60 to 62, is adapted to manages the channel that each of APs 60 to 62 under management thereof uses, and the interference status of each channel collectively.

In FIG. 20, 50 to 52 are a wireless LAN system that APs 60 to 62 configure respectively, and these APs 60 to 62 are connected to the sever 80 with a wire network. Assume that an AP 70 configuring a wireless LAN system 53 is out of management OF the server 80. And, each of APs 60 to 62 makes a report of the interference status of the channel to the server 80, and the server 80 decides the change destination channel of each of APs 60 to 62 under management thereof from this report information prior to occurrence of the interference, and notifies it to each AP.

Figure 21:
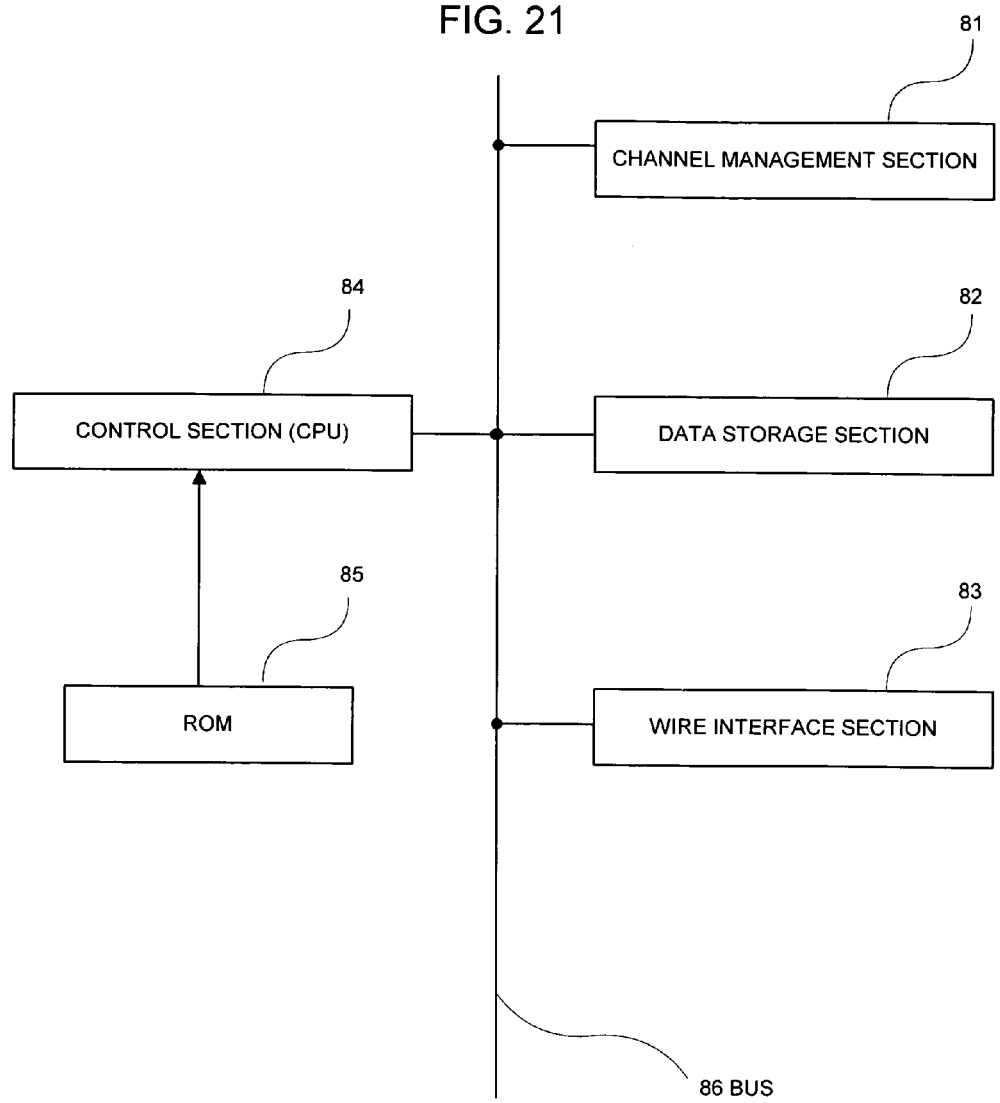
FIG. 21 is a configuration view of the server of the seventh embodiment.

FIG. 21 is a schematic function block diagram of the server 80, which has a channel management section 81, a data storage section 82 for storing the channel that each AP uses, the interference status of each channel, etc., a wire interface section 83 having an interface function with the wire network, a control section (CPU) 84 for controlling each of theses sections, a bus 86 for connecting each of theses sections, and a ROM (record medium) 85 having a control operation of the control section 84 pre-filed as a program.

Figure 22:
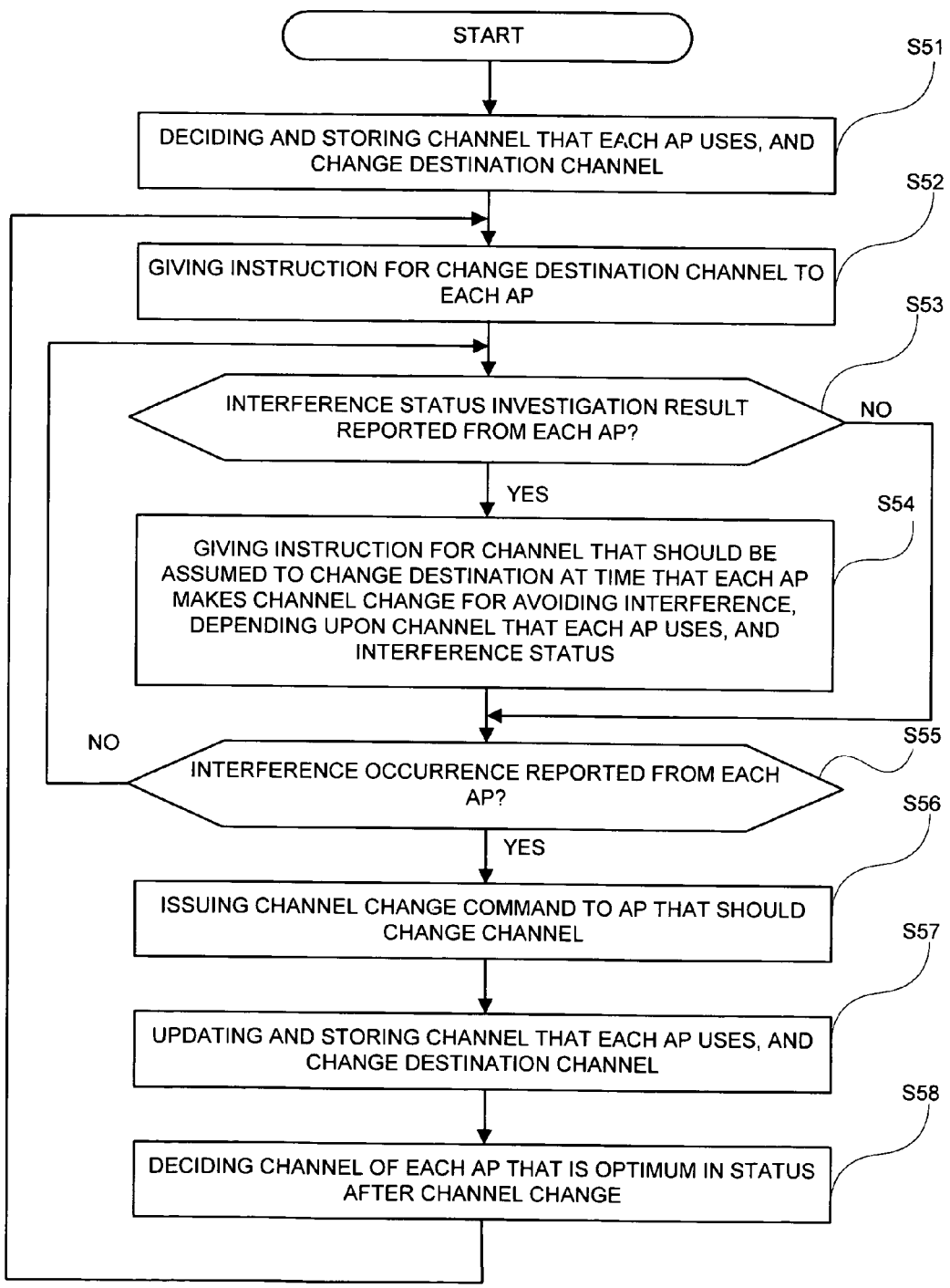
FIG. 22 is an operational flowchart of the server of the seventh embodiment.

FIG. 22 illustrates an example of an operational flowchart of the server 80, which decides the channel that each of APs 60 to 62 under management thereof uses, and the initial value of the change destination channel, and stores them in the data storage section 82 (step S51). At this moment, the initial value of the change destination channel of each AP is preferably decided so that the channel that each AP after the change uses becomes optimum (for example, the interference between each of the APs and the other is minimized). Next, the server 80 gives each AP an instruction for the channel (channel decided in the step S51) that becomes a change destination in making a channel change (step S52). And, in a case where the server 80 received the interference investigation result report from each AP (YES in a step S53), it gives an instruction for the channel that becomes a change destination at the time that each AP makes a channel change for avoiding the interference based upon the above report content, depending upon the channel that each AP uses, and the interference status (step S54).

When the server 80 receives a report of the interference occurrence from the AP (step S55), it generates a channel change command to the AP that should change the channel in order to avoid the interference (step S56). And, it updates the channel the each AP is using, and the change destination within the data storage section 82 (step S57). Thereafter, in the status after the AP that received the channel change command in the step S56 changed the channel, the server 80 decides the change destination channel of each AP so that the channel that each AP uses becomes optimum (step S58), and the operation returns to the step S52. If "NO" in the step S53, the process proceeds to the step S55, and if there is no interference report from AP, the operation returns to the step S53. Making a concentrated management of a pluralities of the Aps in such a manner not to restrict the AP that makes a channel change at the time of the interference occurrence to the AP that made a report of the interference occurrence makes it possible to realize a highly developed channel change with a plurality of the Aps linked.

Figure 23:
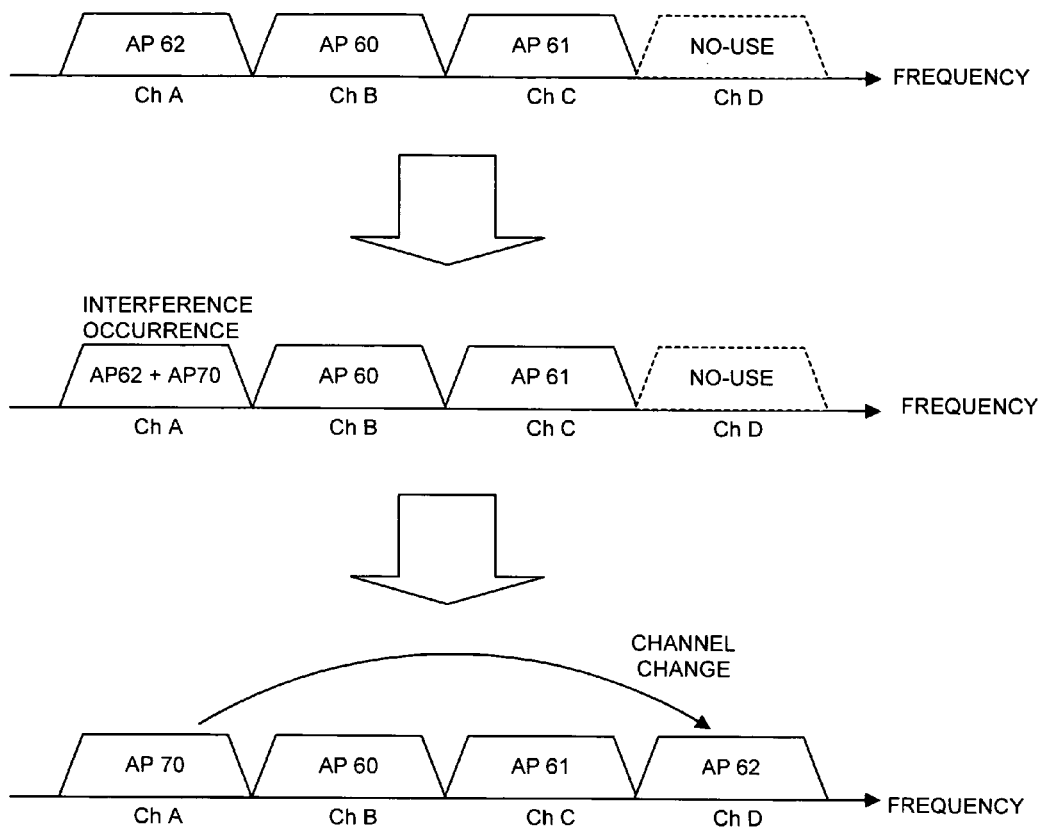
FIG. 23 is a view for explaining the channel change aspect of the seventh embodiment.

FIG. 23 is a view illustrating the channel change status with the configuration of FIG. 20, and in a status where the AP 62 is using the Ch A, the AP 60 is using the Ch B, and the AP 61 is using Ch C respectively, when the Ch A is used in the other wireless LAN system of the AP 70, the interference results in occurring in the wireless LAN system 52 of the AP 62. Thereupon, the server 80 gives the AP 62 an instruction for assuming the Ch D in which no interference occurs to be a change destination channel.

Figure 24:
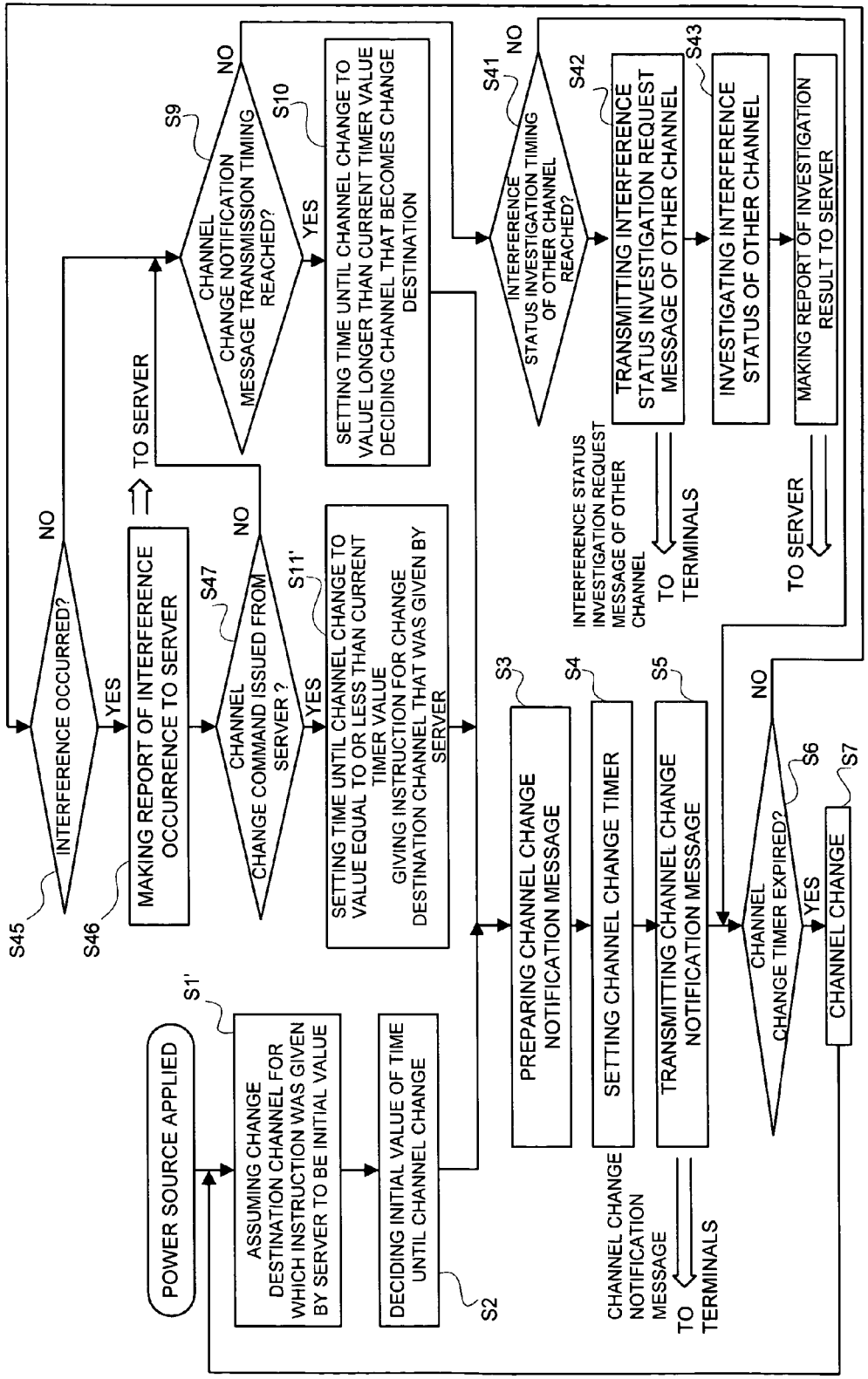
FIG. 24 is a flowchart illustrating one part of the operation of the AP of the seventh embodiment.

FIG. 24 is a flowchart illustrating an operation of the AP, and parts identical to that of FIG. 5 and FIG. 16 are indicated with identical codes. At first, in a step S1', the change destination channel for which an instruction was given by the server is assumed to be an initial value. Also, at this moment, assume that the operation works in the channel for which the server gave an instruction. Next steps S2 to S7 are identical to that of FIG. 5. Identically to FIG. 16, the AP has a wait for the interference status investigation timing of the other channel in a step S41, and executes steps S42 and S43. The interference status investigation result of the other channel is reported to the server in the step S43 (step S44), and the operation returns to the step S6.

In a case where the channel change timer did not expire in the step S6, when the interference occurs (step S45), the AP makes a report of its effect to the server (step S46), has a wait for the channel change command from the server (step S47), and assumes the channel to be included in this command to a channel change destination (step S11'), and the operation proceeds to the step S3. If "NO" in the steps S45 and S47, the operation proceeds to the step S9. The operation of the terminal in this case is identical to that of the first embodiment.

It is apparent that the operational flow in each of the above-mentioned embodiments can be executed, by pre-filing it in the record medium such as the ROM as a program to cause a computer to read it. Also, a case of making communication between the access point (wireless base station) that was an AP, and the child wireless station that was a terminal was described in the above-mentioned embodiments, which can be applied for a case of making direct communication between the child wireless station companions without using the wireless base station; however, in this case, a configuration is made so that one certain child wireless station, which is caused to have a function identical to that of the wireless base station that is the foregoing AP, fills the role of the wireless base station.

Additionally, the channel change having the purpose of avoiding the interference was explained in the above-mentioned embodiments; however they may be used in changing the channel for the other purpose.

What is claimed is:

1. A channel selection method in a communication system for making communication between a first wireless station and one or each of a plurality of second wireless stations different from said first wireless station by employing one of a plurality of wireless channels, wherein:

said first wireless station performs the steps of:
transmitting a first channel change notification including a first time until a channel change and a change destination channel to said second wireless station; and
prior to a lapse of said first time, transmitting a second channel change notification including a second time until a channel change and a change destination channel to said second wireless station; and
said first and second wireless stations perform a step of assuming the time until the channel change to be said second time,
further comprising setting said second time to be included in said second channel change notification that is transmitted after interference occurrence to a time equal to or less than said first time,
further comprising said first wireless station:
prior to a lapse of said second time, transmitting a third channel change notification including a third time until a channel change and a change destination channel to said second wireless station;
setting said third time to a time that becomes identical to a channel change timing that is indicated by said second time;
in a case where an interference improvement was detected before a lapse of said second time since the interference occurrence, transmitting a fourth channel change notification including a fourth time until a channel change and a change destination channel to said second wireless station; and
setting said fourth time to a time longer than said second time.

2. A wireless station for making communication with one or a plurality of other wireless stations by employing one of a plurality of wireless channels, said wireless station comprising:

means for transmitting a first channel change notification including a first time until a channel change and a change destination channel to said other wireless station;
means for, prior to a lapse of said first time, transmitting a second channel change notification including a second time until a channel change and a change destination channel to said other wireless station;
means for assuming the time until the channel change to be said second time, wherein in a case of transmitting said second channel change notification after an interference occurrence, said second time is set to a time equal to or less than said first time;
means for, prior to a lapse of said second time, transmitting a third channel change notification including a third time until a channel change and said change destination channel to said other wireless station;
means for setting said third time to a time that becomes identical to a channel change timing that is indicated by said second time;

means for, in a case where an interference improvement was detected prior to a lapse of said second time since interference occurrence, transmitting a fourth channel change notification including a fourth time until a channel change and a change destination channel to said other wireless station; and means for setting said fourth time to a time longer than said second time.

3. A wireless terminal for, by employing a wireless channel designated by a wireless station, making communication with said wireless station, said wireless terminal comprising:

means for receiving a first message including a first channel change time and a first change destination channel from said wireless station;

means for, after said first message was received, assuming said first change destination channel to be a channel that is employed for communication after a lapse of said first channel change time; and means for, in a case where a second message including a second channel change time and a second change destination channel was received from said wireless station prior to a lapse of said first channel change time, assuming said second change destination channel to be a channel, which is employed for communication, after a lapse of said second channel change time since said second message was received.

4. The wireless terminal according to claim 3, further comprising means for making a channel switchover based upon an instruction for switching a channel that is an object of observation in order to observe the interference status, said instruction being given by the wireless station.

5. The wireless terminal according to claim 3, wherein said wireless station is a wireless base station connected to its own wireless terminal with a wireless channel.

\* \* \* \* \*